US012725376B2

(12) United States Patent
Ahmadi et al.

(10) Patent No.: US 12,725,376 B2
(45) Date of Patent: Sep. 1, 2026

(54) DEVICES, MEDIA, AND METHODS FOR IMAGING AND MEASURING WALLS AND DÉCOR ITEMS

(71) Applicant: 3M INNOVATIVE PROPERTIES COMPANY, St. Paul, MN (US)

(72) Inventors: Amir Ahmadi, Savannah, GA (US); Frederick J. Arsenault, Stillwater, MN (US); Andrew P. Baussan, West St. Paul, MN (US); Brian E. Brooks, St. Paul, MN (US); Christopher M. Brown, Cottage Grove, MN (US); Glenn E. Casner, Woodbury, MN (US); Landon B. Davis, Woodbury, MN (US); Joseph Horowitz, Brooklyn, NY (US); Brett P. Krull, St. Anthony, MN (US); Maya Pandurangan, Edison, NJ (US); Travis W. Rasmussen, Rosemount, MN (US); Robert W. Shannon, Stillwater, MN (US); Margaret M. Sheridan, Woodbury, MN (US); Gautam Singh, Woodbury, MN (US); Lori A. Sjolund, Stillwater, MN (US); Nader Tavaf, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 18/863,506

(22) PCT Filed: May 16, 2023

(86) PCT No.: PCT/IB2023/055049

§ 371 (c)(1),
(2) Date: Nov. 6, 2024

(87) PCT Pub. No.: WO2023/237949

PCT Pub. Date: Dec. 14, 2023

(65) Prior Publication Data

US 2025/0299450 A1 Sep. 25, 2025

(51) Int. Cl.

*G06T 19/00* (2011.01)
*G06F 3/04842* (2022.01)
*G06F 3/04845* (2022.01)

(52) U.S. Cl.

CPC ........ *G06T 19/006* (2013.01); *G06F 3/04842* (2013.01); *G06F 3/04845* (2013.01); *G06T 2210/04* (2013.01)

(58) Field of Classification Search

None

See application file for complete search history.

(56) References Cited

U.S. PATENT DOCUMENTS

| | | | |
|---|---|---|---|
| 8,478,111 | B2 | 7/2013 | Stankiewicz et al. |
| 10,026,229 | B1 | 7/2018 | Yalniz et al. |

(Continued)

FOREIGN PATENT DOCUMENTS

| | | | |
|---|---|---|---|
| WO | 2022005850 | A1 | 1/2022 |

OTHER PUBLICATIONS

Anonymous: "AR—See Your New Print in Your Own Space, with Augmented Reality," Jun. 9, 2020, pp. 1-11, [retrieved from the internet on Sep. 4, 2023: https://www.paulreiffer.com/2020/06/ar-see-your-new-fine-art-print-in-your-own-space-with-augmented-reality/].

(Continued)

*Primary Examiner* — Frank S Chen

(74) *Attorney, Agent, or Firm* — Bryan L. Walker

(57) ABSTRACT

A method includes detecting, via object detection hardware, a portion of at least one of a plurality of objects, receiving object attributes for the at least one of a plurality of objects, providing at least one contact area, based upon the object (Continued)

attributes, on each of a plurality of object representations corresponding to each of the at least one of a plurality of objects, providing a surface representation, displaying, via display hardware, the plurality of object representations each residing upon the surface representation, and displaying at least one support area on the surface representation corresponding to the at least one contact area associated with the plurality of object representations.

20 Claims, 18 Drawing Sheets

(56) References Cited

U.S. PATENT DOCUMENTS

| | | | |
|---|---|---|---|
| 10,319,150 B1 | 6/2019 | Canada et al. | |
| 10,672,191 B1 * | 6/2020 | Besecker | G06T 19/006 |
| 11,157,740 B1 * | 10/2021 | Agarwal | G06F 3/04845 |
| 2014/0132595 A1 | 5/2014 | Boulanger et al. | |
| 2021/0255328 A1 | 8/2021 | Sanjeev et al. | |

OTHER PUBLICATIONS

Command—Picture Frame Placement, 2021, 22 pages.
International Search Report for PCT International Application No. PCT/IB2023/055049, mailed on Sep. 18, 2023, 4 pages.

* cited by examiner

DEVICES, MEDIA, AND METHODS FOR IMAGING AND MEASURING WALLS AND DÉCOR ITEMS

CROSS REFERENCE TO RELATED APPLICATIONS

This application is a national stage filing under 35 U.S.C. 371 of PCT/IB2023/055049, filed May 16, 2023, which claims the benefit of U.S. Provisional Application No. 63/349,308, filed Jun. 6, 2022, the disclosures of which are incorporated by reference in their entireties herein.

BACKGROUND

Hanging décor can be time consuming, stressful, and error-prone. In conventional approaches to hanging multiple pieces of décor, for example, users precisely measure and create a layout on paper or using a computer, attempt to apply the hanging hardware precisely to the wall, and then adjust the positioning if the artwork pieces are misaligned. Users who want to hang a multi-frame design typically use a ruler and a level to measure and mark points on a wall to assure proper placement. This unfortunately does not allow users to easily preview potential frame layout designs before undertaking all of this extra effort and potentially damaging walls by installing hanging hardware.

SUMMARY

In one embodiment, a computing device includes a memory and a processor, wherein the memory is coupled to the processor. The computing device may further include object detection hardware communicatively coupled to the processor, the object detection hardware in combination with the processor being configured to detect a portion of each of a plurality of objects, determine object attributes for each of the plurality of objects based upon the detected portion of each of the plurality of objects, provide at least one contact area, based upon the object attributes, on each of a plurality of object representations corresponding to each of the plurality of objects. The computing device may further include surface detection hardware communicatively coupled to the processor, the surface detection hardware in combination with the processor being configured to detect a surface within a line of sight of the surface detection hardware; and detect attributes of the surface. The computing device may further include display hardware communicatively coupled to the processor, the display hardware in combination with the processor being configured to display the plurality of object representations each residing upon a same surface representation, and display a plurality of support areas on the surface representation corresponding to contact areas associated with the plurality of object representations.

In another embodiment, a method includes detecting, via object detection hardware, a portion of at least one of a plurality of objects, receiving object attributes for the at least one of a plurality of objects, providing at least one contact area, based upon the object attributes, on each of a plurality of object representations corresponding to each of the at least one of a plurality of objects, providing a surface representation, displaying, via display hardware, the plurality of object representations each residing upon the surface representation, and displaying at least one support area on the surface representation corresponding to the at least one contact area associated with the plurality of object representations.

In a further embodiment, a non-transitory computer-readable medium is encoded with instructions that, when executed, cause processing circuitry of a computing device to detect, via object detection hardware, a portion of each of a plurality of objects, determine object attributes for each of the plurality of objects based upon the detected portion of each of the plurality of objects, provide at least one contact area, based upon the object attributes, on each of a plurality of object representations corresponding to each of the plurality of objects, detect, via surface detection hardware, (i) a surface within a line of sight of the surface detection hardware and (ii) attributes of the surface, display, via display hardware, the plurality of object representations each residing upon a same representation of the surface, and display a plurality of support areas on the surface representation corresponding to contact areas associated with the plurality of object representations.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims.

DETAILED DESCRIPTION

The present disclosure describes techniques for imaging and measuring walls and décor items. In embodiments, by scanning walls to determine their dimensions, and comparing this to received dimensional data from the décor, then virtual representations of the décor can be displayed upon the walls in augmented reality (AR). By scanning décor, its weight can also be determined so that various types of support devices can be recommended to the user and the support device placement upon the frame of the décor can be suggested. Once all the décor has been input, various configurations of the décor can be presented to and selected by the user. To increase the accuracy of the user's placement of the décor according to a selected décor configuration, the user can be guided in AR to mark the locations of contact areas on the wall that correspond to where the support devices are or will be attached to the décor. To further increase this accuracy, as the user subsequently moves the décor into position within the AR interface, real-time feedback (visual, audio, verbal, haptic, and the like) can help guide them towards more precise placement.

Figure 1A:
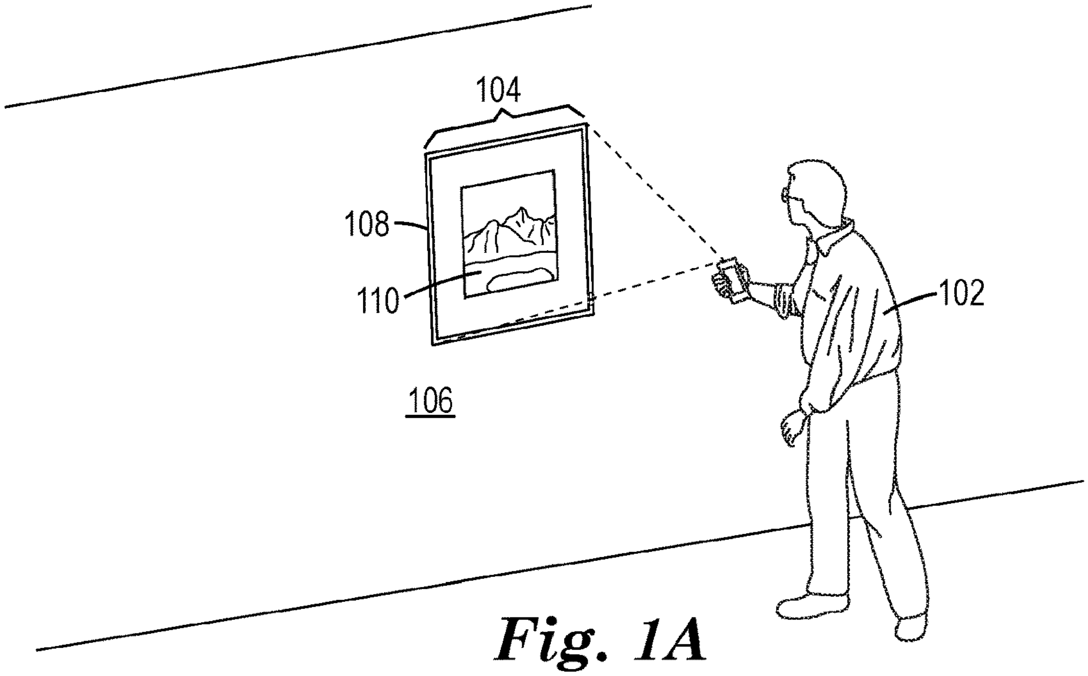
FIG. 1A schematically depicts a smartphone user scanning décor in accordance with embodiments herein.

Referring now to FIG. 1A, a user 102 scanning décor 104 is depicted. Although a smartphone is depicted in this embodiment, any type of mobile device 100 (smartphone, tablet, laptop, wearable computing device, and the like) may be utilized by a user 102 to scan décor 104 that may be located on a wall 106 or in any other location where it may be viewable/scannable, such as propped up or lying flat on a floor. In other embodiments, other types of computing devices including non-mobile computing devices may be utilized. Décor 104 may be any type of object capable of being hung up or otherwise displayed for viewing, such as stretched canvas décor. Décor 104 may alternatively include a frame 108 and framed media 110. Any quantity of décor 104, in any combination of types, and in any suitable configuration of décor 104 upon one or more walls 106 may be utilized. A wall 106 may include any vertical or substantially-vertical surface capable of supporting décor 104 being mounted and/or hung upon it or otherwise attached. In this embodiment, the mobile device 100 may include scanning hardware 112 to capture any suitable type of scanning data (three-dimensional data, two-dimensional data, photo, live view, stereoscopic, laser, and the like). Scanning hardware 112 may include, for example, one or more sensors (such as a LiDAR sensor or any other sensor capable of obtaining three-dimensional data) as discussed with respect to a sensor 1530 in FIG. 15, one or more cameras as discussed with respect to an image capture device 1522 in FIG. 15, and/or one or more lasers that may be used to scan, for example, bar codes and/or quick response (QR) codes. In this embodiment, the décor 104 may be scanned based upon being observed by the mobile device 100, such that any suitable techniques discussed herein, such as object recognition, may be utilized to identify the décor 104. As used herein, a portion of décor 104 refers to at least a subset of the décor, up to and including the entirety of the décor that is visible to the scanning hardware 112.

Figure 1B:
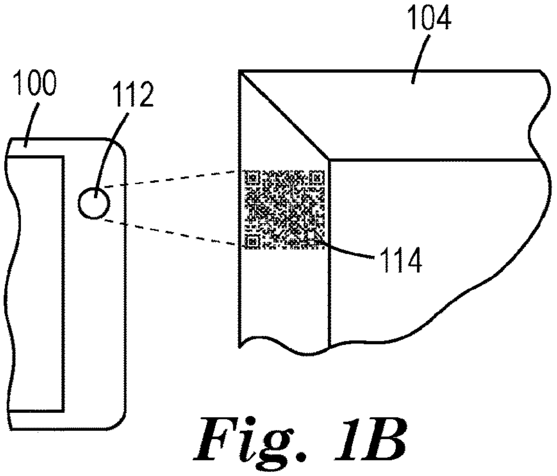
FIG. 1B schematically depicts a smartphone user scanning a barcode on the frame of décor in accordance with embodiments herein.

Referring now to FIG. 1B, a user 102 scanning a barcode on the frame of décor is depicted. Although depicted as a barcode, any type of identifier 114 capable of being scanned by any suitable type of device (camera, laser, LiDAR, and the like) may be utilized, such as a QR code, barcode, serial and/or model number, and the like. In this embodiment, once the identifier is scanned, data regarding the scanned décor 104 may be displayed to the user to provide information regarding the décor 104 in accordance with embodiments described herein. In some embodiments, object recognition may be used to associate the data obtained from scanning an identifier 114 located on the décor 104 with the décor 104 as identified through the object recognition.

Figure 1C:
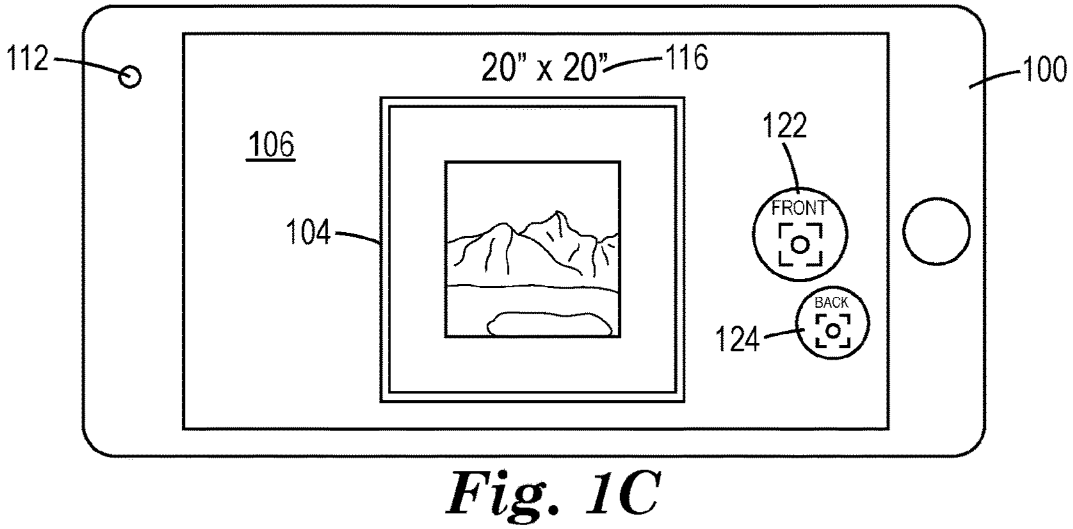
FIG. 1C depicts an augmented reality frontal view of décor with overlain measurements in accordance with embodiments herein.

Referring now to FIG. 1C, an AR frontal view of décor with overlain dimensions 116 is depicted. In this example, measurement attributes of a 20 inch height and a 20 inch width overlay the décor 104. Any suitable unit of measure (metric, English, and the like) may be utilized to express measurements such as height, width, depth, weight, and the like. The overlain measurements may include, for example, dimensions such as height and width of the décor 104, which may be obtained via object recognition by scanning the décor 104 and/or performing a scan of an identifier 114 to retrieve dimensions associated with a known décor type. In some embodiments, measurements may be obtained by, for example, segmenting the décor 104 out from the background 118 and calculating the height and width of the décor 104 in relation to the detected distance from the mobile device 100 to the décor 104. Depicted interface icons 120 include a front view icon 122 and a rear view icon 124. In this embodiment, pressing the front view icon 122 indicates to the mobile device 100 that the front of the décor 104 is within the current view. In another interface, user input may be received to specify décor 104 size measurements (specifying height/width, for example) and/or décor 104 size as it appears on the wall (see, for example, FIG. 4D). For example, a user may user sliders to modify décor dimension(s), weight, and/or displayed size-on-wall in the interface. In other embodiments, the user may manually specify the measurements and/or weight of the décor 104.

Figure 2:
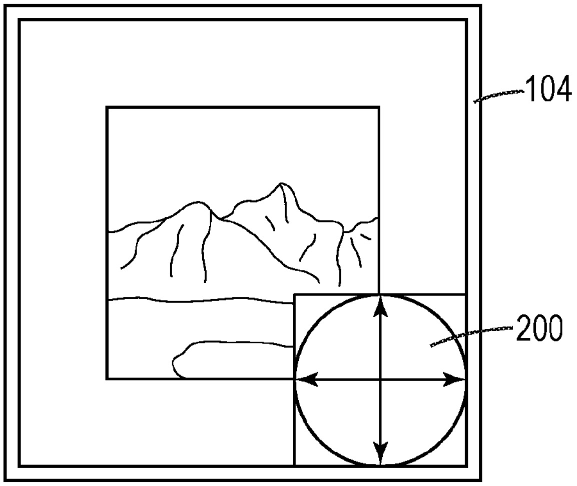
FIG. 2 depicts a frontal view of décor with a fiducial residing thereupon in accordance with embodiments herein.

Referring now to FIG. 2, a frontal view of décor 104 with a fiducial 200 (herein also referred to as a known scale reference, fiducial object, and/or a known reference) residing thereupon is depicted. FIG. 2 depicts décor 104 with a fiducial 200 (in this example it is a square with a 5" circle on it), such that based on the detection of this fiducial and the subsequent determination of the aspect ratio of this reference (for example, pixels per inch wide and high). The fiducial 200 may alternately reside on a wall 106, floor, ceiling, or any other suitable surface where it can be observed. In this embodiment, dimensions of the décor 104 or a wall (not shown) may be estimated by dividing its rescaled dimensions by the pixel-per-inch scale.

Figure 3A:
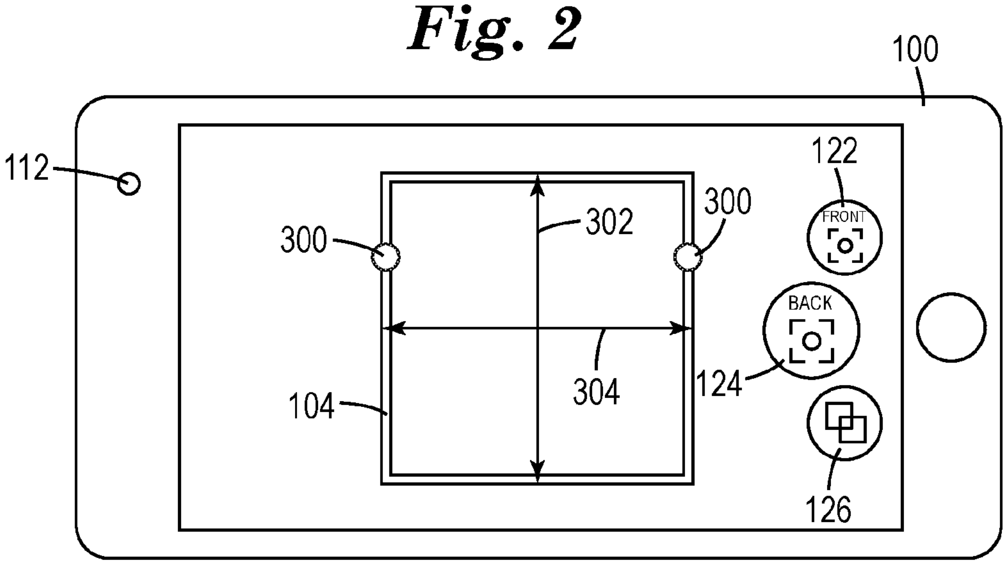
FIG. 3A depicts an augmented reality rear view of décor with overlain support areas in accordance with embodiments herein.

Referring now to FIG. 3A, an AR rear view of décor 104 with overlain contact areas 300 is depicted. In embodiments, either the scale of the décor 104 obtained from the front side scan/images can be used to scale the segmented backside view of the décor 104 or the corresponding approaches may be applied to the backside view of the décor 104. Here, the rear view icon 124 has been selected, which indicates that the back of the décor 104 should be expected. A switch 126 icon in some embodiments may be utilized to switch between décor front view and rear view. In other embodiments, the switch 126 icon may switch between or cycle through different available décor 104. Dimensional data such as décor height 302 and décor width 304 may be displayed, based upon retrieved data pertaining to the identified décor 104 (such as from a database when an identifier is scanned), object recognition utilizing machine learning (as described further with respect to FIG. 13), and/or use of a fiducial (as described further with respect to FIG. 2). In some embodiments, the depth of the décor 104 may be determined and/or displayed based upon three-dimensional scanning, such as with LiDAR, and/or the weight of the décor 104 may be estimated, determined, and/or displayed based upon retrieved data pertaining to the identified décor 104 (such as from a database if an identifier was scanned) and/or object recognition utilizing machine learning (as described further with respect to FIG. 14) in which the weight may be estimated based upon the detected dimensions, and in some embodiments, material(s) of the décor 104 and, if applicable, its frame 108.

Figure 3B:
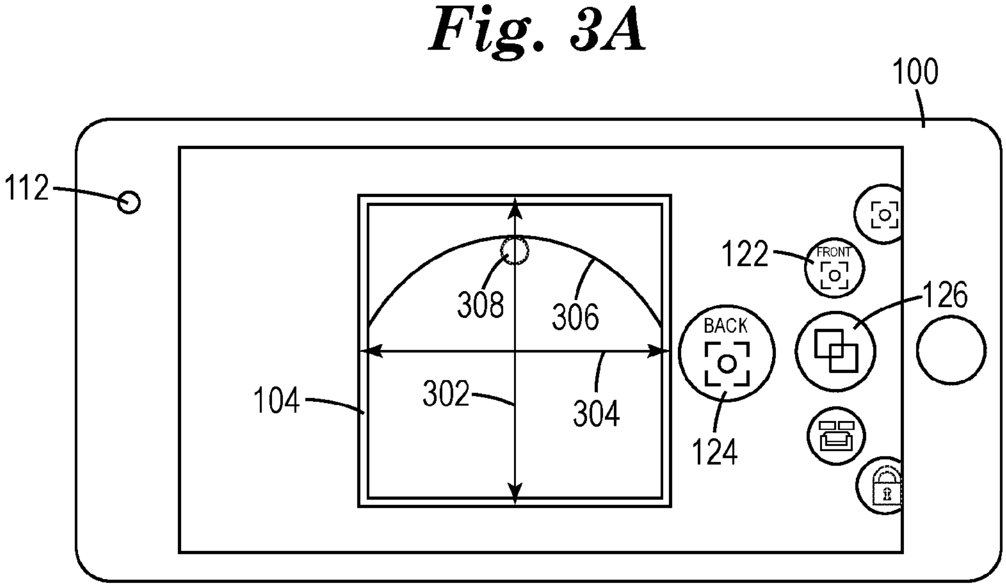
FIG. 3B depicts an augmented reality rear view of different décor with a different overlain support area based on a detected mounting hardgood in accordance with embodiments herein.

Referring now to FIG. 3B, an AR rear view of different décor with a different overlain support area based on a detected mounting hardgood is depicted. Here, the rear view icon 124 has been selected, which indicates that the back of the décor 104 is expected as input to mobile device 100. In embodiments, the user 102 may specify that the mounting hardgoods include a wire 306, and/or hold the frame 108 up so that décor 104 is supported via the wire 306 by their fingertips to capture images used to estimate the amount of wire deflection to identify an optimal hanging position 308. The estimate of this corrected hanging point might be determined via stereoscopic, fiducial approaches, or both. Dimensional/weight data procurement/display may be performed as described with respect to the frontal décor view depicted in FIG. 3A.

Figure 3C:
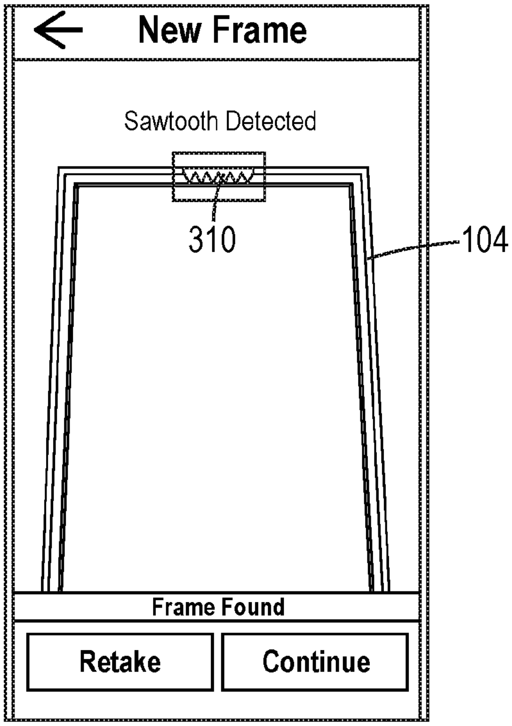
FIG. 3C depicts an augmented reality rear view of another décor with a mounting hardgood detected in accordance with embodiments herein.

Referring now to FIG. 3C, an AR rear view of another décor 104 with a detected mounting hardgood 310 depicted. Mounting hardgoods 310 may be identified either by neural networks, user input, or both. More specifically, this may be accomplished via training an algorithm to detect mounting hardware (as discussed further with regard to FIG. 13), having the user click on the contact areas 300 of the frame 108 of the décor 104, or both. In this embodiment, the detected mounting hardgood 310 is a sawtooth, although any suitable type and/or quantity of mounting hardgoods may be detected. The detected mounting hardgoods 310 may be utilized according to the embodiments herein, or may be replaced either by decision of the user or based upon recommendation of other mounting hardgood options, such as being compared to other mounting hardgood options based upon décor weight (as described with respect to FIG. 14).

Figure 4A:
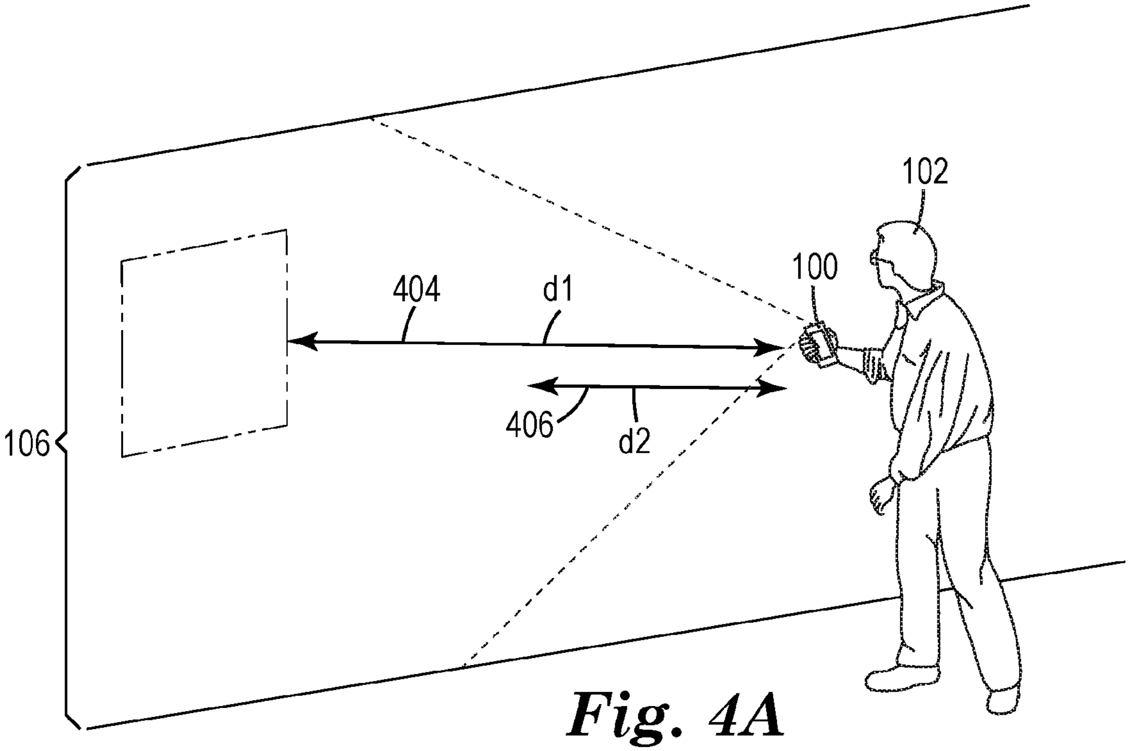
FIG. 4A schematically depicts a user utilizing a mobile device to scan a wall in accordance with embodiments herein.

Referring now to FIG. 4A, a user 102 utilizing a mobile device to scan a wall 106 within a line of sight is depicted. Wall attributes, such as height 400 and/or width 402 may be determined by techniques such as utilizing a fiducial for scale, LiDAR for three-dimensional scanning, stereoscopic measurement, fiducials, and the like, although some techniques may be better suited for use over different distances. For example, LiDAR may be utilized from a further wall distance 404, while fiducials and/or stereoscopic measurements may be utilized at a closer wall distance 406 that is exceed by the further wall distance 404. In some embodiments, the type of technique may be automatically determined by the wall distance, such that if a wall is detected by LiDAR to be within a closer wall distance 406, then stereoscopic measurement and/or fiducials may be utilized instead. In other embodiments, a user may manually enter wall dimensional data or scan a barcode/QR code to provide data regarding the wall.

Figure 4B:
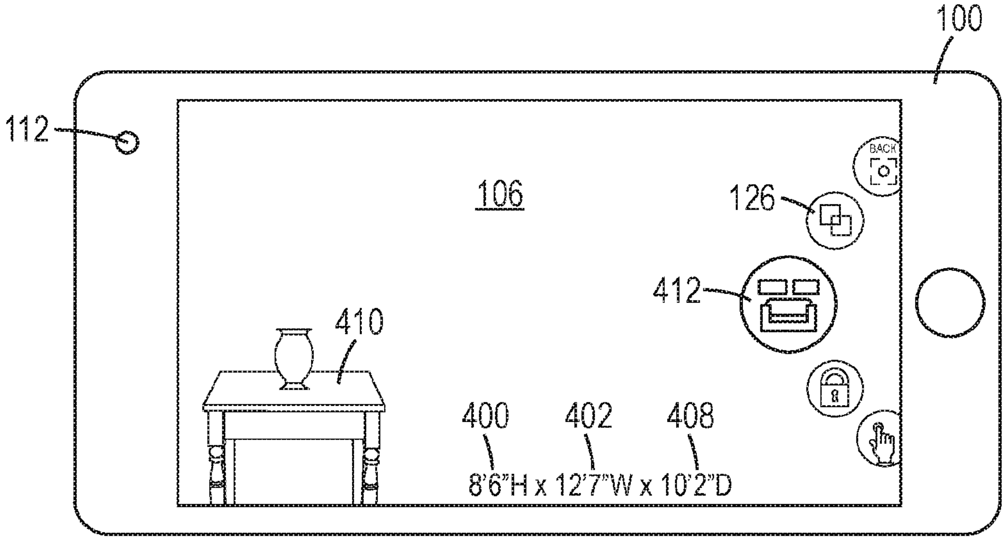
FIG. 4B depicts an augmented reality view of a wall with overlain measurements in accordance with embodiments herein.

Referring now to FIG. 4B, an AR view of a blank wall 106 with overlain measurements of wall height 400, wall width 402, and current wall distance 408 depicted within a décor layout view icon 412 within the interface icons 120. If the AR view is based upon a live view (such as from a camera), then the wall height 400, wall width 402, and current wall distance 408 values may be continuously updated based upon movement of the mobile device 100. Non-décor 410 is depicted in front of the wall 106 within the frame of view of the mobile device 100. In some embodiments, the user 102 may be prompted regarding whether an identified object is actually décor 104 or otherwise provided candidate décor 104, as discussed with respect to FIGS. 5A-5D, such that the user 102 may decline a mistaken suggestion of non-décor 410 to avoid having it misidentified as décor 104.

Figure 4C:
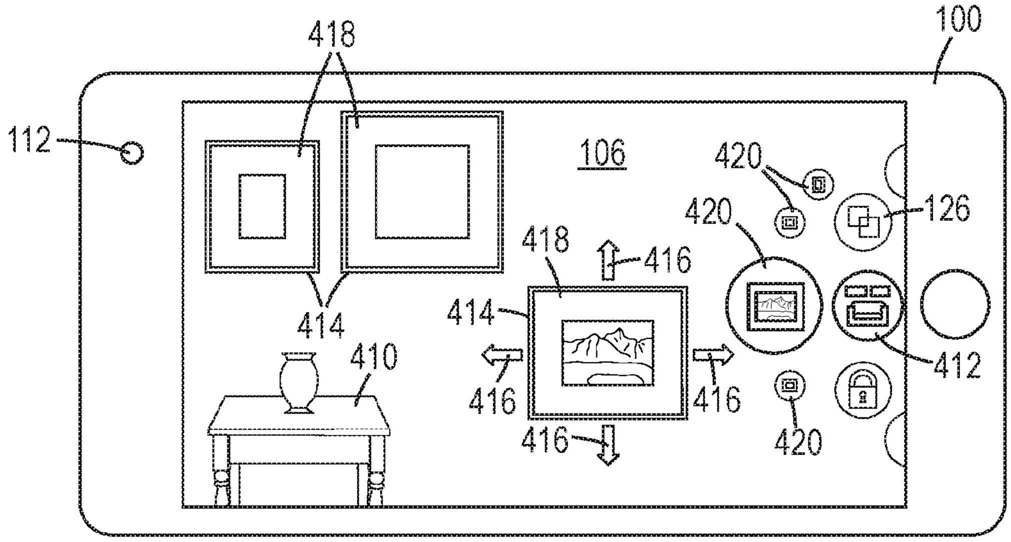
FIG. 4C depicts an augmented reality view of a wall with overlain décor and overlain placement options in accordance with embodiments herein.

Referring now to FIG. 4C, an AR view of a wall 106 with overlain décor 414 and overlain placement options 416 is depicted. In this embodiment, a décor group 418 is depicted as being overlain upon the blank wall 106. A second group of décor thumbnails 420 may be displayed, for example, utilizing the décor layout view icon 412. In this way, the user may alternately select décor thumbnails 420 to move between the overlain décor 414 that is currently-active. In other embodiments, overlain décor 414 may become selected/active based upon a prolonged selection indicator (prolonged touching of a touchscreen, holding down a mouse click, and the like). In some embodiments, all or a subset of the overlain décor 414 may be selected, such that the selected overlain décor 414 may be moved together as group (e.g., moving all selected overlain décor 414 up the same direction together by the same amount).

Figure 4D:
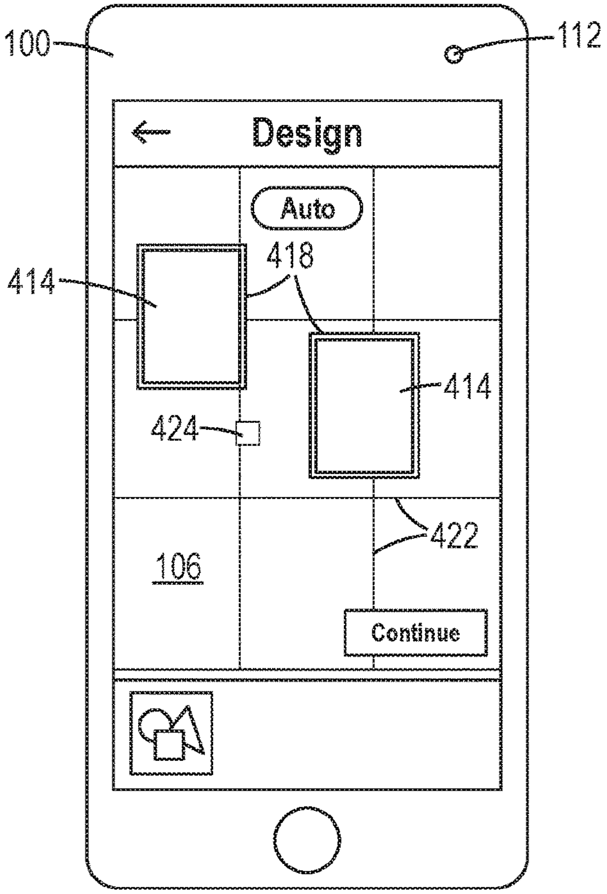
FIG. 4D depicts an augmented reality view of a wall with a fiducial and overlain décor and an overlain grid in accordance with embodiments herein.

Referring now to FIG. 4D, an AR view of a wall with a fiducial 200 and overlain décor 414 aligned to an overlain canvas grid 422 is depicted. In this embodiment, the user may be instructed to capture an image of a wall 106 with an anchor object 424 visible, in which the anchor object 424 may be a fiducial 200 or décor 104 already on the wall. After the overlain décor 414 has been arranged, the mobile device viewpoint may be aligned to the wall 106 so that the version of the anchor object 424 in the image (or overlain version of the anchor object 424) may be aligned with the actual anchor object 424. In this way, the proposed design of overlain décor 414 may be aligned to the wall 106.

Figure 5A:
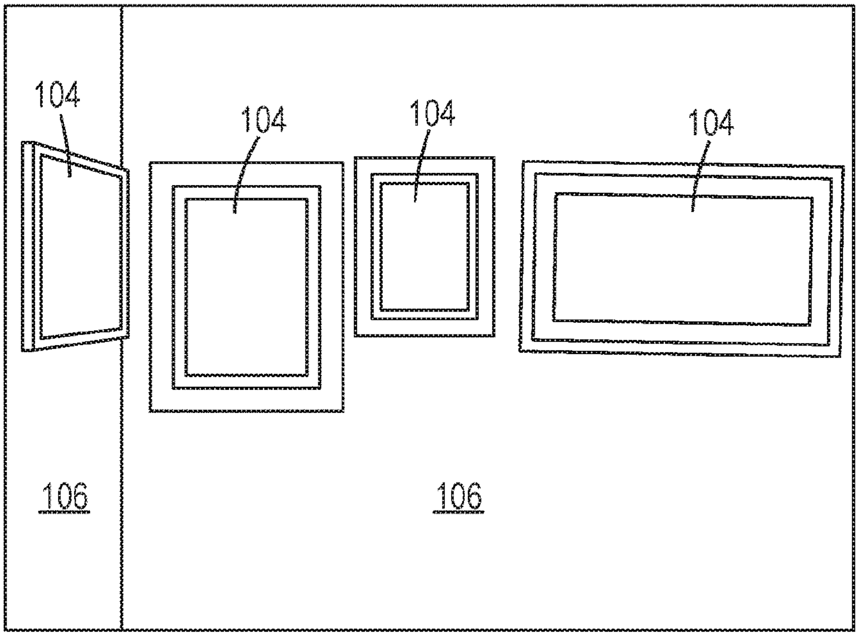
FIG. 5A depicts intersecting walls with décor in accordance with embodiments herein.

Referring now to FIG. 5A, two intersecting walls 106, each with décor 104, are depicted (in this embodiment, substantially perpendicularly intersecting walls forming a concave corner). Specifically, one framed décor 104 is located on one wall 106, and three framed décor 104 are located on the other wall 106.

Figure 5B:
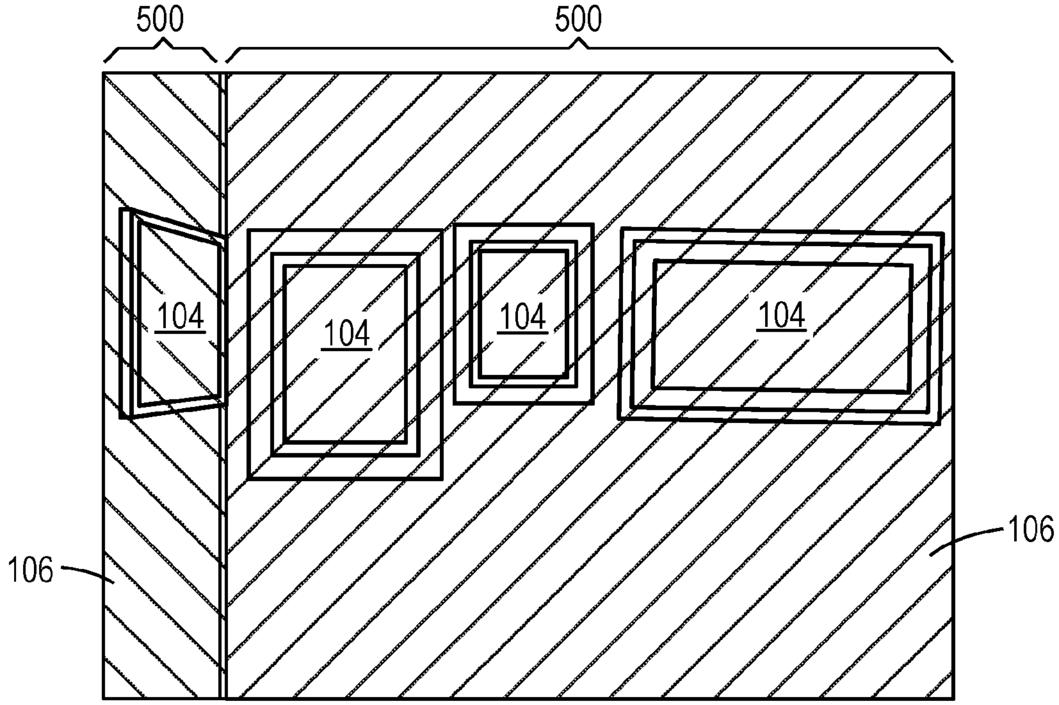
FIG. 5B depicts an augmented reality view of the intersecting walls of FIG. 5A with the intersecting walls segmented with differing overlain shading in accordance with embodiments herein.

Referring now to FIG. 5B, an AR view of the intersecting walls of FIG. 5A with the intersecting walls segmented with recognition indicators 500 is depicted, which in some embodiments may appear as overlain highlighting. Recognition indicators 500 may utilize shading or any other suitable type of indicator to denote the shaded object (wall, décor, and the like) has been segmented. Here, the two intersecting walls 106 are segmented out from each other, without regard to the décor 104. In one embodiment, segmentation divides the data into different classes of objects (the definition is broadly applicable to three-dimensional point cloud or two-dimensional red-green-blue (RGB) or a mixed red, green, blue, depth (RGB-D) data). There are two components to this use case embodiment. First, given the data, a wall 106 is segmented out. More specifically, this may involve assigning pixels in two-dimensional or three-dimensional data to a "wall" class as well as distinguishing between different walls 106 by drawing the boundaries and determining surface normals of walls. The second component, décor segmentation, is discussed below with respect to FIG. 5C.

Figure 5C:
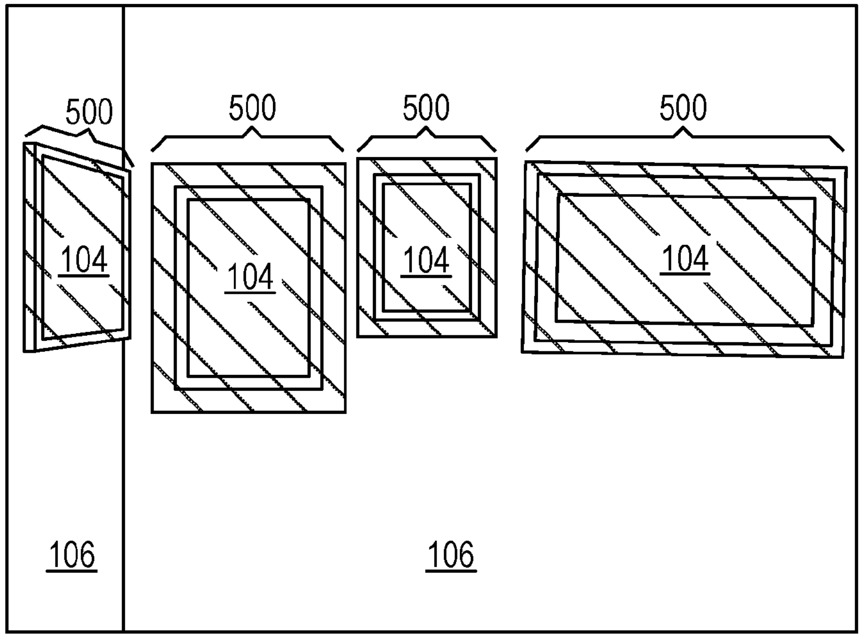
FIG. 5C depicts an augmented reality view of FIGS. 5A-5B with the décor each having overlain highlighting in accordance with embodiments herein.

Referring now to FIG. 5C, an AR view of FIGS. 5A-5B with the décor each having recognition indicators 500 is depicted. Here, the décor 104 is being segmented, with or without regard to the respective walls 106 upon which each resides. This may involve assigning pixels in two-dimensional or three-dimensional data to a "décor" class as well as distinguishing between different instances of décor 104.

In this embodiment, two different approaches may be used for segmentation of walls 106 (see FIG. 5B), and/or segmentation of the décor 104 on the walls 106. In one approach, three-dimensional point cloud data obtained using a depth sensor (LiDAR scanner) may be the basis of segmentation. In a second approach, two-dimensional images obtained using cameras (RGB and the like) may be the basis of the segmentation. Alternatively, the two-dimensional data (RGB and the like) can be co-registered with the three-dimensional point cloud depth data to form a single RGB-D dataset in a unified approach to segmentation. In any of these cases, segmentation algorithms may be employed to solve any relevant segmentation protocols. Such segmentation algorithms can be divided into unsupervised (when a labeled dataset is not available, e.g., clustering three-dimensional point cloud data) and supervised (when a labeled dataset is available to train algorithms, e.g., supervised learning approaches using RGB-D data) modules. In another embodiment, shading may be utilized.

Figure 5D:
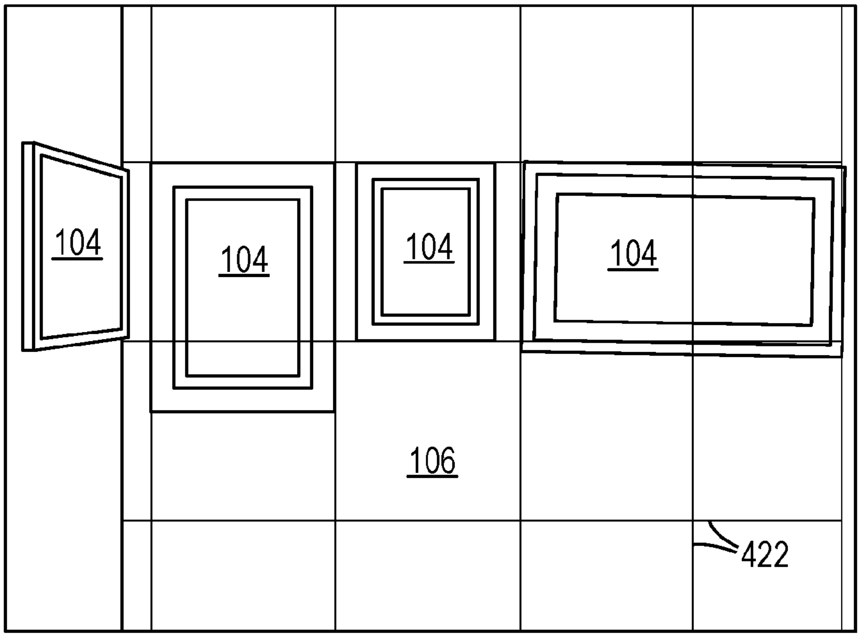
FIG. 5D depicts an augmented reality view of FIGS. 5A-5C with respective canvas grids overlaying the intersecting walls in accordance with embodiments herein.

Referring now to FIG. 5D, an AR view of FIGS. 5A-5C with respective canvas grids 422 overlaying the intersecting walls 106 is depicted. Specifically, overlain décor 414 may replace or obscure the décor 104. In some embodiments, segmented décor (or separately photographed décor) may form the basis of overlain décor 414. For example, a photo taken of décor (whether upon a wall or on the floor, such as the photo taken of the décor 104 in FIG. 3C) may form the basis of a décor thumbnail 420 and/or a virtual representation in the form of overlain décor 414. In another embodiment, a scanned identifier 114 may be used to retrieve relevant attribute data (size, weight, and the like) to provide overlain décor 414 in proportion to the wall(s) 106.

Figure 6:
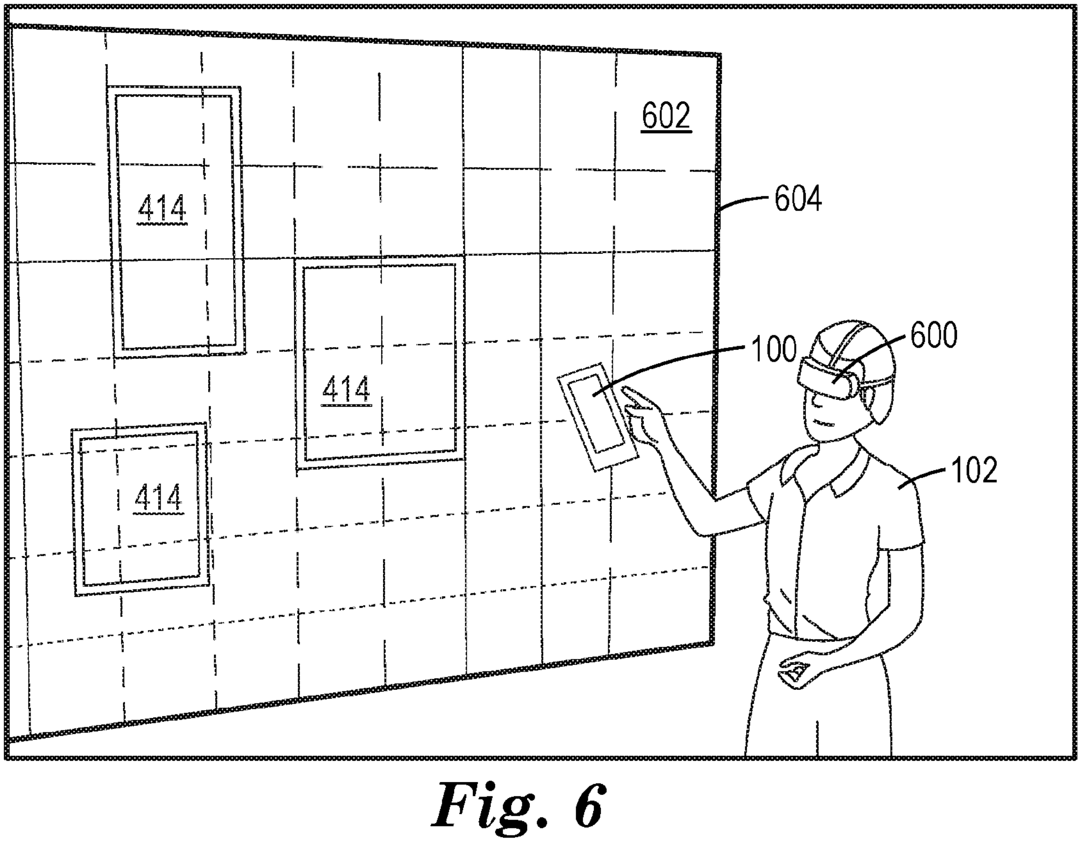
FIG. 6 schematically depicts a user wearing an augmented reality headset to align décor to an overlain wall grid in accordance with embodiments herein.

Referring now to FIG. 6, a user 102 wearing an AR headset 600 to align décor 104 to an overlain wall grid 602 is depicted. More specifically, within a frame design interface 604, the user 102 may create a canvas on a wall 106 that frames out the specific locations that they want to hang décor 104. The user 102 may utilize the AR headset 600 to measure the décor 104 to be hung and enter those décor sizes into a library of décor (or frames). The user 102 can then pull décor 104 from that library to virtually place onto the wall 106 and organize on the canvas grid 422. Once the user 102 has their desired design, they can apply mounting hardgoods to the back of the décor and hang each on the overlain wall grid 602. In another embodiment, the user 102 may select from one or more predetermined dimensional sizes of one or more décor 104. For example, the user 102 may be able to select décor 104 having one size option 15 inches height by 10 inches width and another size option of 24 inches height and 20 inches width. Any functionality described with respect to the AR headset 600 may, in some embodiments, be available in other devices (such as smartphones and the like) and vice versa.

Figure 7A:
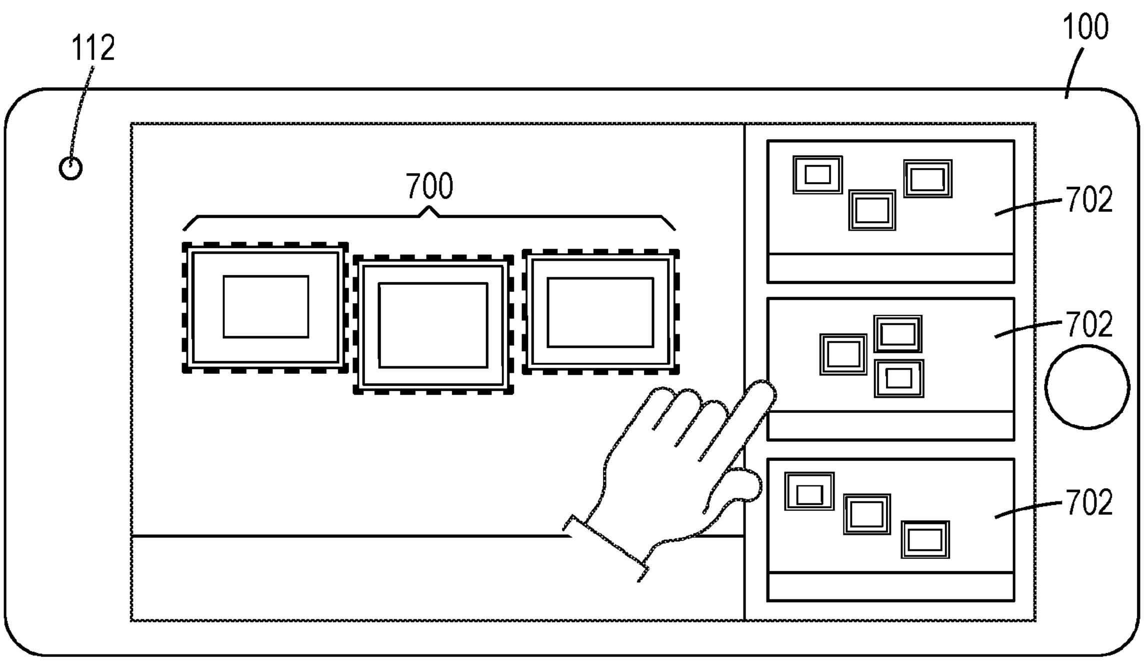
FIG. 7A depicts an augmented reality view of selectable décor placement configurations overlain on a wall in accordance with embodiments herein.

Referring now to FIG. 7A, an AR view of selectable décor arrangements 700 overlain on a wall is depicted. More specifically, a set of overlain décor 414 is depicted as being overlain upon a wall 106 without being structured according to any particular type of predefined arrangement. In this way, individual overlain décor 414 may be selected and then moved and/or manipulated, as described with respect to FIG. 4C. Additionally, arrangement thumbnails 702 may be provided to conveniently show suggested arrangements of how the décor group 418 would look, which may also take into account non-décor 410 such as the table and/or vase depicted in FIGS. 4B-4C, which in some embodiments may be depicted in the arrangement thumbnails 702.

Figure 7B:
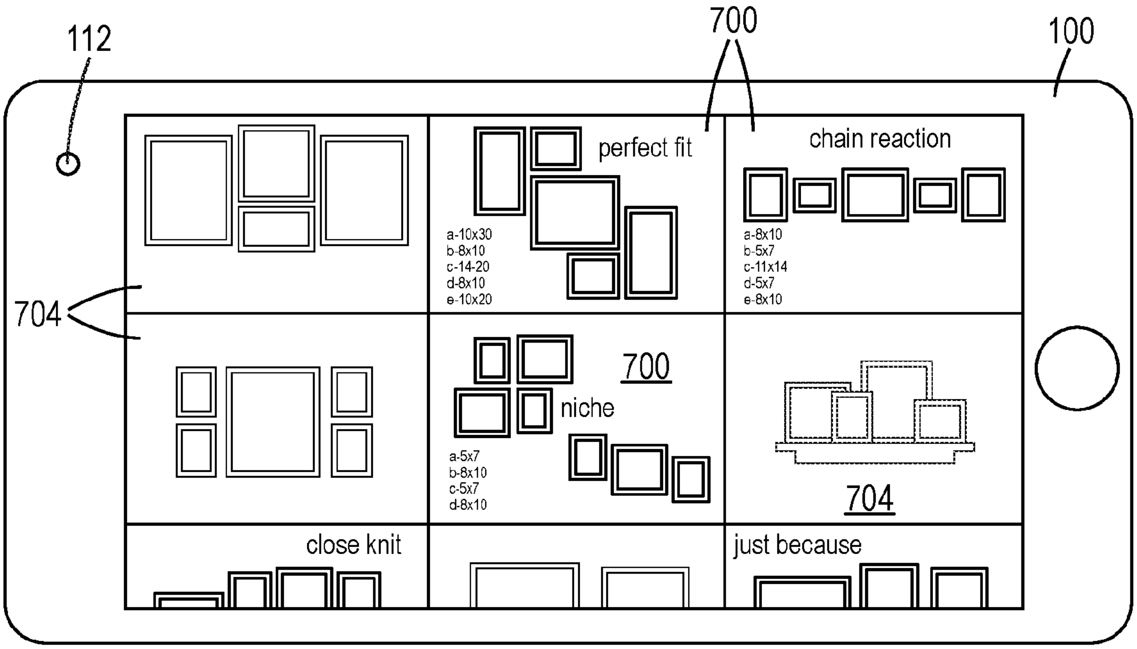
FIG. 7B depicts a graphical interface of selectable décor placement configurations in accordance with embodiments herein.

Referring now to FIG. 7B, a graphical interface of selectable décor arrangements 700 is depicted. The selectable décor arrangements 700 depicted in this embodiment may allow for selection of arrangements of different quantities of décor 104 and different sizes of décor 104 and/or frames 108. Thus, the framed media 110 (e.g., art) arrangement possibilities may be represented without regard to pre-existing sizes or even which framed media 110 is to be utilized (as the specific framed media 110 may vary among selectable décor arrangements 700). Thus, selectable décor arrangements 700 can each provide varying quantities and sizes of frames and/or décor 104. In some embodiments, non-selectable arrangements 704 may be shown in any suitable manner (faded, and the like) to indicate that they are not presently selectable, which may be based on any suitable criteria, such as the size of the wall.

Figure 8A:
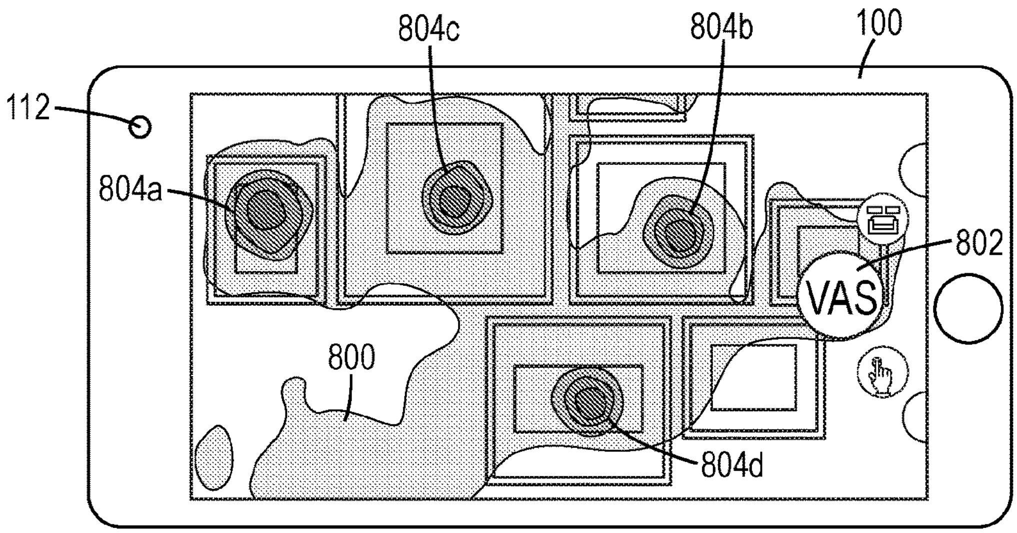
FIG. 8A depicts an augmented reality view of an attention map overlain upon décor residing upon a wall in accordance with embodiments herein.

Referring now to FIG. 8A, an AR view of an attention map 800 overlain upon décor 104 on a wall 106 is depicted. In one embodiment, a visual attention software (VAS) icon 802 may be selected, wherein VAS may be utilized to provide analysis for users to manipulate the visual attention to a décor arrangement 700, as shown and described by way of non-limiting example in U.S. Pat. No. 8,478,111 entitled "Systems and Methods for Optimizing a Scene." Once a décor arrangement 700 is chosen or designed, VAS may be used to analyze the décor arrangement 700 and provide feedback about where an average viewer would spend the most time looking, which décor 104 would be the most visually interesting in the arrangement, and an estimated probability of the order in which the décor 104 would be viewed by an average viewer. VAS may be utilized to help make hanging and arranging décor 104 on walls easier and more accurate, along with providing users with more confidence that their arrangements will draw attention in a desired way.

An attention map 800 may be produced utilizing a data visualization technique that shows magnitude of a phenomenon, such technique including color variation and/or shading in two dimensions. Areas on the wall 106 and non-décor 410 may also be rated with regard to their propensity to attract visual attention. Thus, areas drawing more attention may be colored or shaded by the degree of attention they are expected to receive. By way of non-limiting example, red may be used for indicating peak visual attention, yellow for medium visual attention, blue for low visual attention, and so forth. Referring to FIG. 8A, one attention area 804*a*, corresponding to the décor 104 on the left, is shaded more prominently for attention than other attention areas 804*b*, 804*c*, and 804*d*. This indicates that attention area 804*a* thus more prominently attracts attention than other shaded attention areas 804*b*, 804*c*, and 804*d*.

Figure 8B:
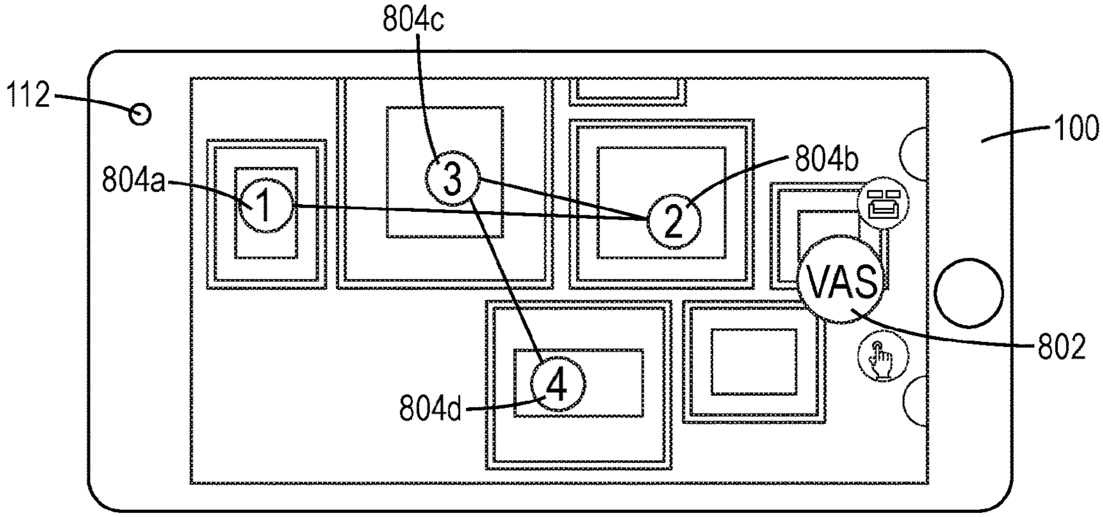
FIG. 8B depicts an augmented reality view of overlain attention rankings overlain upon the décor of FIG. 8A in accordance with embodiments herein.

Referring now to FIG. 8B, the predicted sequence of viewing is provided based upon where someone is predicted most to look first, then next, and so forth, with respect to the décor of FIG. 8A. In this view of the attention map, attention levels are indicated for each décor 104 as whole, and in this embodiment, without regard to variances within each décor 104. Thus, in this example, the décor 104 on the left is labelled '1', which corresponds to the highest attention area 804*a* residing within the left-most décor 104, and indicates this area would be first to draw attention, followed by décor 104 labelled '2', and so forth. While the décor drawing the first look is also the center décor 104, which corresponds to the highest rated décor 104, it should be noted that this may not be a strict correlation in all embodiments.

Figure 8C:
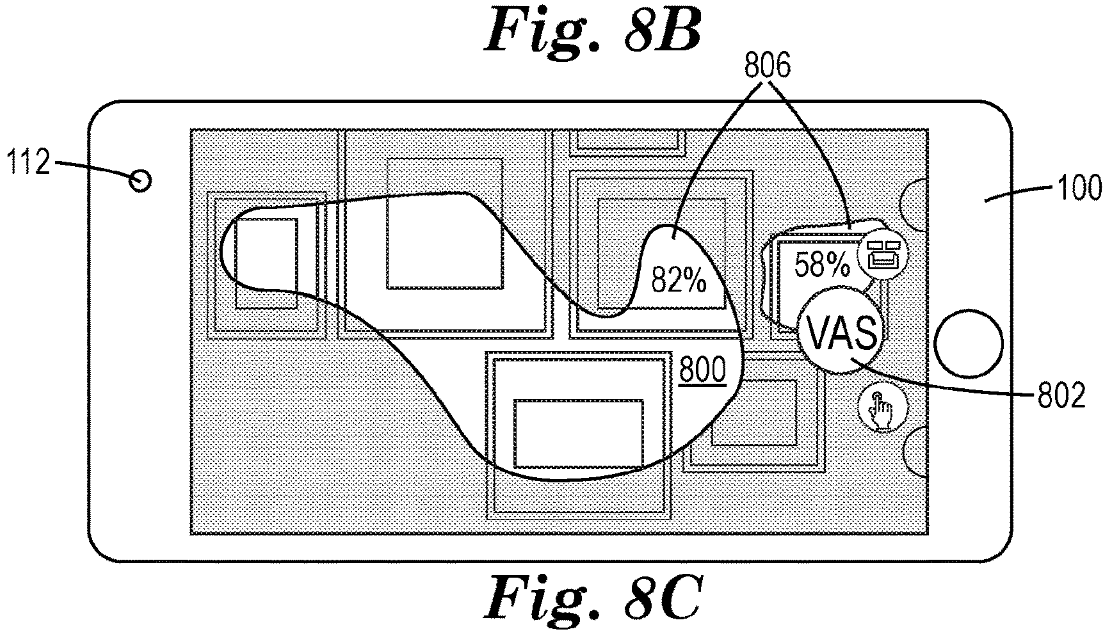
FIG. 8C depicts an augmented reality view of an overlain attention region overlain upon the décor of FIGS. 8A-B in accordance with embodiments herein.

Referring now to FIG. 8C, an AR view of an overlain attention region overlain upon the décor of FIGS. 8A-B is depicted. Here, décor 104 may be provided with a percentage score or any other suitable type of indicator for displaying and/or ranking the décor 104. In addition to an outline that indicates general regions for attention, scores may be assigned to such general regions and/or individual décor 104, which need not correspond precisely to the attention map 800 depicted in FIG. 8A and/or the predicted sequence of viewing depicted in FIG. 8B. In some embodiments, décor arrangements 700 in some embodiments may be based at least in part on VAS recommendations.

Figure 9A:
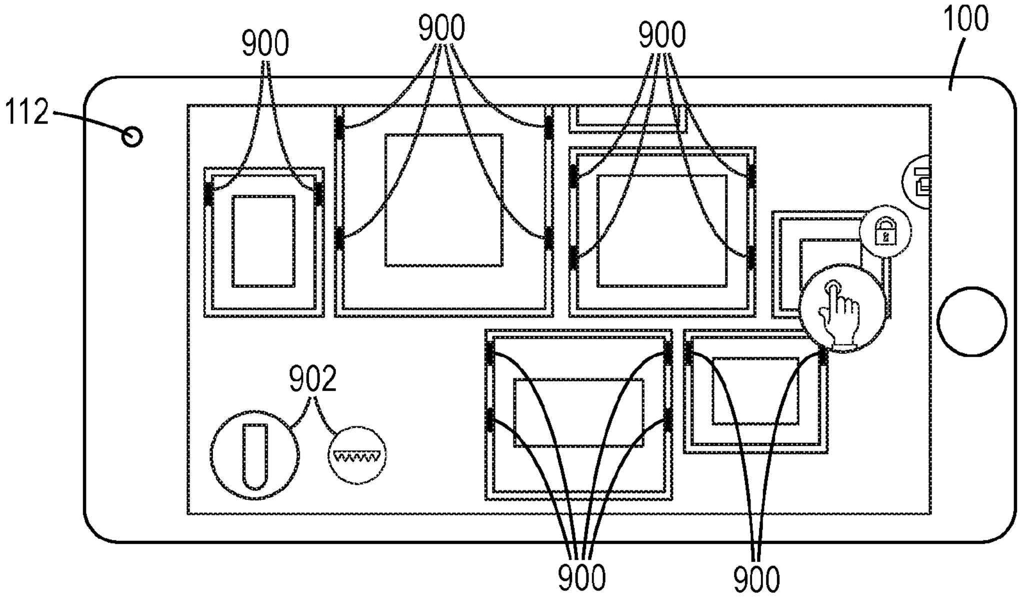
FIG. 9A depicts an augmented reality view of a wall with an overlay of décor and associated support areas in accordance with embodiments herein.

Referring now to FIG. 9A, an AR view of a wall with overlain décor 414 and associated support areas 900 is depicted. In this example, mounting strip-style hardgoods (such as Command™ Strip stretch release mounting strips available from 3M Company) have been selected (as indicated by the enlarged mounting hardgood icon 902 depicting a Command™ Strip) as the basis for contact areas 300 as depicted on the overlain décor 414. The contact areas 300 also correspond to support areas 900 located on the wall 106. As explained with respect to FIGS. 10A-10D, the AR representation of support areas 900 may be used to form the basis of mounting hardgood 310 support and location on the wall 106.

Figure 9B:
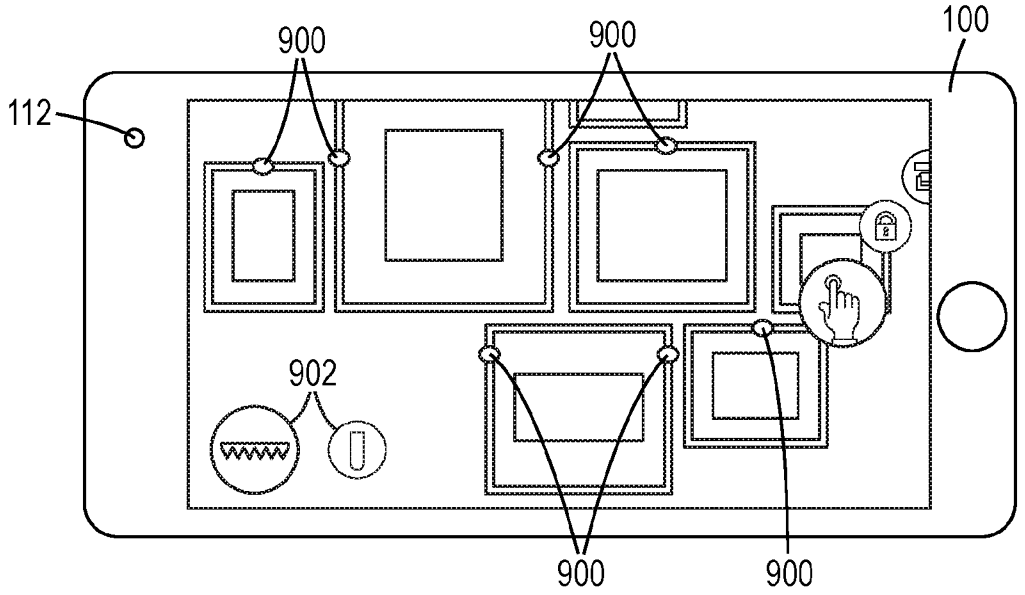
FIG. 9B depicts an augmented reality view of the wall with the overlay of décor of FIG. 9A with alternate support areas in accordance with embodiments herein.

Referring now to FIG. 9B, an AR view of the wall with the overlay of décor of FIG. 9A with alternate support areas 900 is depicted. More specifically, in this example the sawtooth mounting hardgoods 310 have been selected (as indicated by the enlarged mounting hardgood icon 902 depicting a sawtooth) as the basis for contact areas 300 as depicted on the overlain décor 414, such that for some of the overlain décor 414 this mounting hardgood 310 option utilizes one centered mounting hardgood 310, rather than two peripheral mounting hardgoods used in the option depicted FIG. 9A. Thus, fewer sawtooth mounting hardgoods, contact areas 300, and corresponding support areas 900 may be overlain due to any combination of factors such as where on the décor 104 different types of mounting hardgoods 310 could reside, the weight-bearing capacity of each mounting hardgood 310, and the like.

Figure 10A:
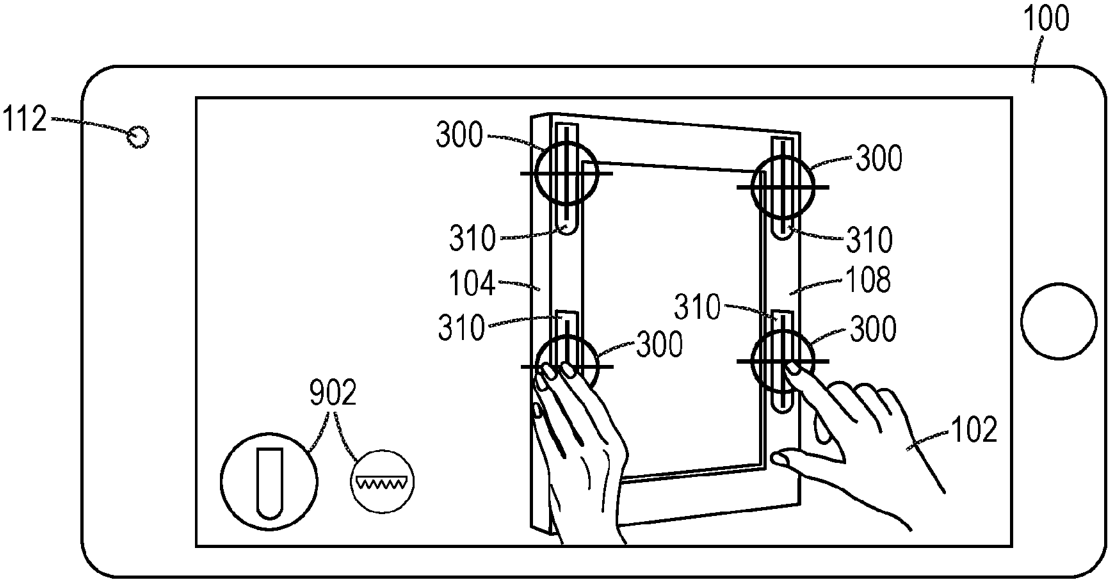
FIG. 10A depicts an augmented reality view of mounting hardgood placement in relation to overlain contact areas in accordance with embodiments herein.

Referring now to FIG. 10A, an AR view of mounting hardgood placement in relation to overlain contact areas 300 is depicted. The locations of suggested contact areas 300 are overlain in an AR view upon the back of the décor 104. Here, the hands of user 102 are depicted in a live camera view as installing Command™ Strips as the selected mounting hardgood 310 at the suggested contact areas 300. In this embodiment, another type of mounting hardgood 310 may be selected from multiple mounting hardgood options, such that location and/or quantity of overlain contact areas 300 may be updated based upon the currently selected mounting hardgood type. Using an AR live camera view, the suggested contact areas 300 may remain overlain on the same area on the back of the frame 108 of décor 104 even if the view changes in the live view. Similarly, if a photo is used instead, then the suggested contact areas 300 may be displayed in relation to the contact areas 300 as overlain on the back of the décor 104.

Figure 10B:
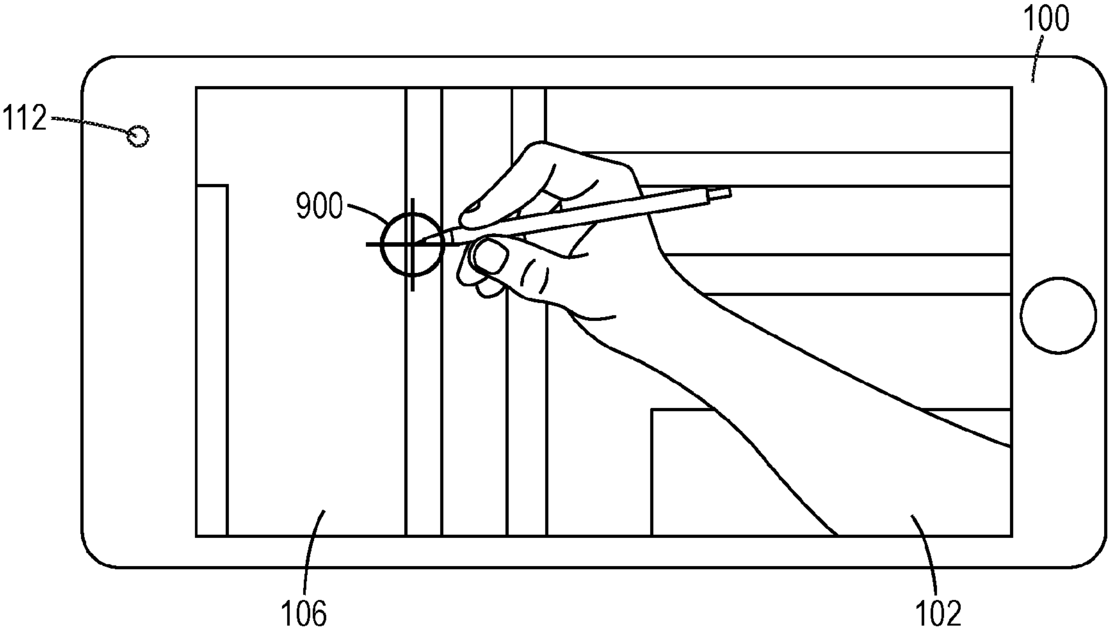
FIG. 10B depicts an augmented reality view of a user marking a wall based upon an overlain support area in accordance with embodiments herein.

Referring now to FIG. 10B, an AR view of a user marking a wall 106 based upon an overlain support area 900 is depicted. Referring back to FIGS. 9A-9B, suggested support areas 900 may be overlain upon a wall 106 as corresponding to contact areas 300 for overlain décor 414 in an AR view. In this embodiment, suggested support areas 900 may be overlain on the wall 106 without corresponding contact areas 300 or overlain décor 414. Instead, the user 102 may be instructed to mark the wall 106 utilizing any suitable technique (pen, pencil, marker, pin, thumbtack, nail, etc.). If a photo is used, then the suggested support areas 900 may be displayed upon the appropriate locations on the wall 106 within the photo. If an AR live camera view is utilized, however, then the suggested overlain support areas 900 may correspondingly move to continue to overlay the same area of the wall 106 even as the view of the wall 106 changes in the live view. In other embodiments, the user 102 may be instructed to mark on a wall 106 a boundary and/or edge of the décor to aid in its accurate placement.

Figure 10C:
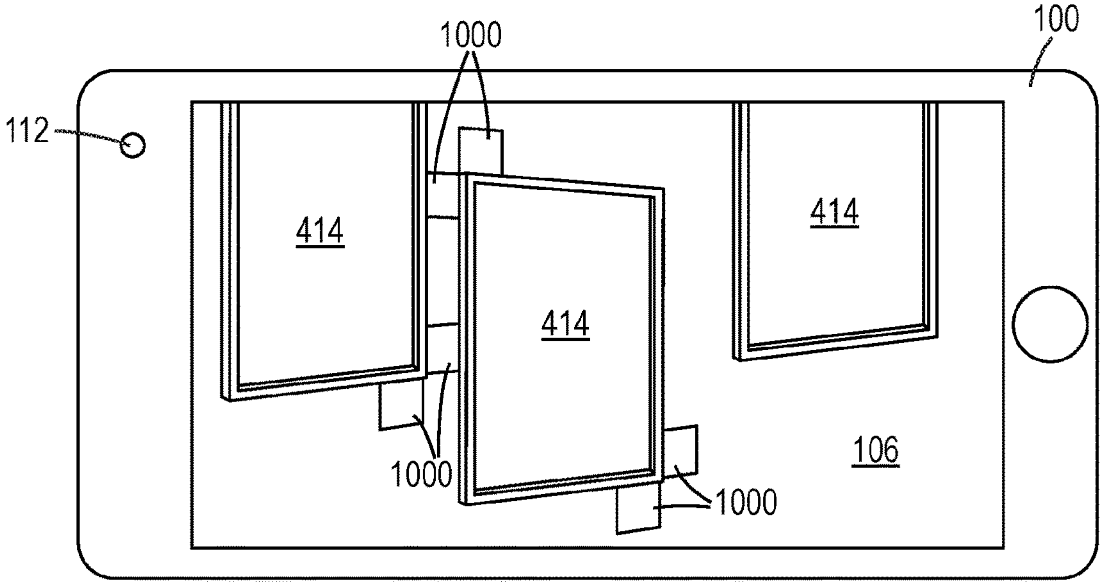
FIG. 10C depicts an augmented reality view of décor with corner markers overlain upon a wall in accordance with embodiments herein.

Referring now to FIG. 10C, an AR view of décor 104 with corner markers 1000 overlain upon a wall 106 is depicted. In this embodiment, overlain décor 414 is depicted along with corner markers 1000 in the form of overlain Post-It® Notes representing corners of the overlain décor 414, along with overlain suggested support areas 900 and/or corresponding contact areas. Any suitable object or virtual representation of a suitable object may be utilized to denote corners and/or other portions of overlain décor 414 and/or décor 104. In this embodiment, a corner marker 1000 represent the left side boundary of the overlain décor 414 at the top-left corner of the overlain décor 414. Another corner marker 1000 represents the top side boundary of the overlain décor 414 at the top-left corner of the overlain décor 414. Two additional corner markers 1000 (overlain Post-It® Notes in this embodiment) are similarly used to denote the bottom-right corner of the overlain décor 414. Two other corner markers 1000 are similarly used to denote the bottom-right corner of other overlain décor 414. In this way, the corner markers 1000 may act as a guide for décor 414 placement without needing to put marks upon the wall 106. The corner markers 1000 may move to consistently overlay the same portions of the wall if the camera move in a live view AR. In this way, the user may then place real corner markers 1000, such as Post-It® Notes, where the overlain corner markers 1000 are located to aid accurate placement of décor 104.

Figure 10D:
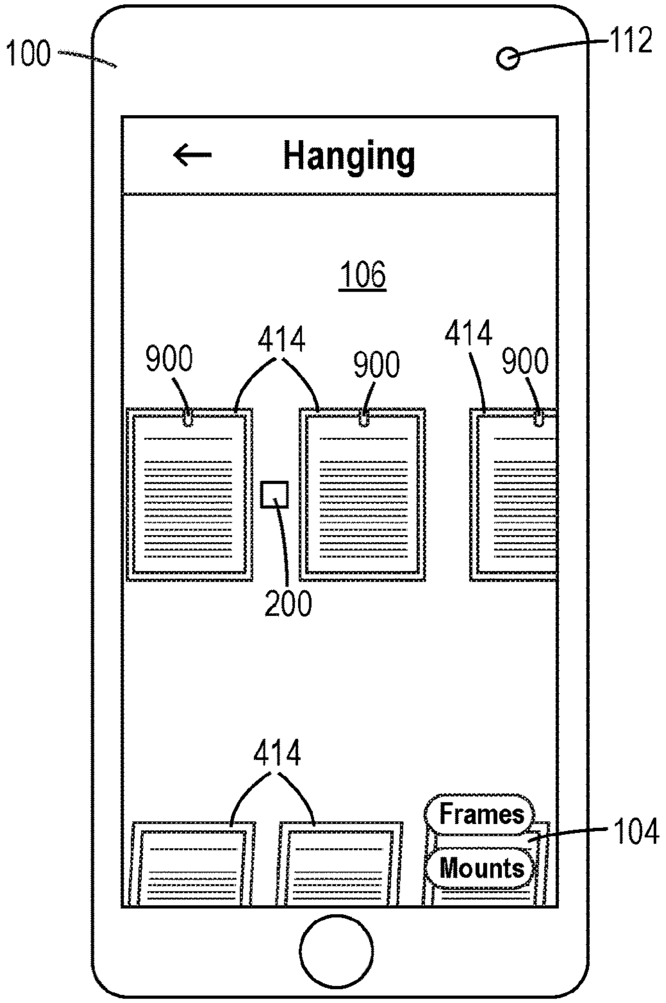
FIG. 10D depicts an augmented reality view of décor laid against a wall with overlain décor and overlain support areas in accordance with embodiments herein.

Referring now to FIG. 10D, an AR view of décor 104 laid against a wall 106 with overlain décor 414 and overlain suggested support areas 900 is depicted. In this embodiment, a user has an option to choose between viewing overlain décor 414 (e.g., "frames"), overlain suggested support areas 900 (e.g., "mounts"), and/or both. Here, both the overlain décor 414 and the overlain suggested support areas 900 are shown, along with a fiducial 200 that may be utilized to provide scale and/or location accuracy for both the overlain décor 414 and overlain suggested support areas 900. The décor 104 is shown at the bottom of the wall 106, but may reside anywhere within view or, in some embodiments, need not reside within view.

Figure 11A:
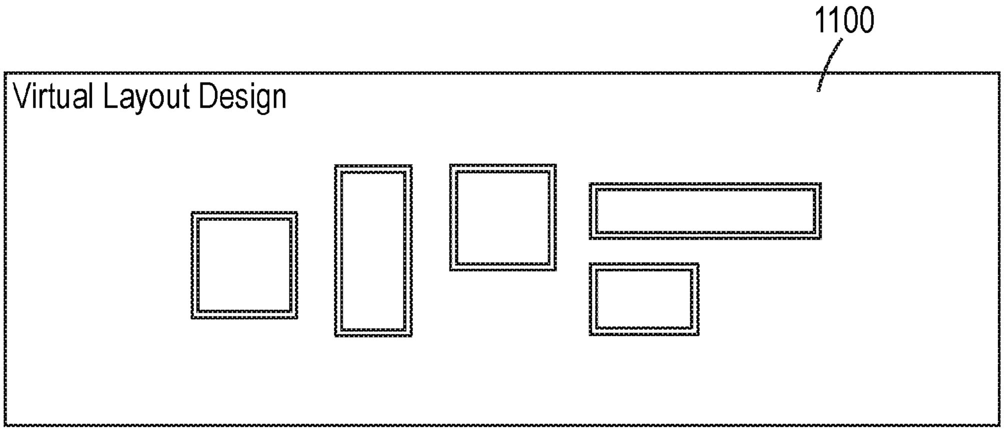
FIG. 11A depicts a virtual arrangement of décor in accordance with embodiments herein.

Referring now to FIG. 11A, a virtual arrangement of décor is depicted. In this embodiment, the virtual layout design 1100 represents the layout selected by the user 102.

Figure 11B:
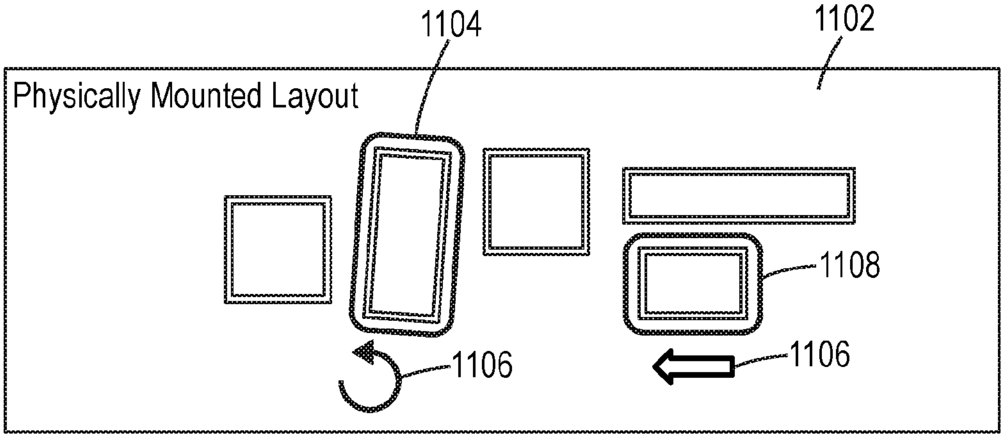
FIG. 11B depicts a physically mounted layout of décor with correction suggestions in accordance with embodiments herein.

Referring now to FIG. 11B, a physically mounted layout of décor with correction suggestions is depicted. In this embodiment, the uncorrected physical layout 1102 depicts an overlay of how it deviates from the virtual layout design 1100 as previously approved by the user. For example, askew décor 1104 is depicted with feedback 1106 in the form an overlain arrow indicating the rotational direction to conform the askew décor 1104 with the virtual layout design 1100. Similarly, misaligned décor 1108 is depicted with feedback 1106 in the form of a left arrow to indicate how the misaligned décor 1108 should be moved to bring it into conformity with the virtual layout design 1100 of FIG. 11A. In some embodiments, this may involve providing one or more suggested mounting hardgoods for an object based upon a weight value of the object, a quantity of potential contact locations for one or more mounting hardgoods, or a combination thereof, such that the mounting hardgood type affects quantity of contact areas and location of contact areas. In some embodiments, the quantity of potential contact locations may exceed a quantity utilized by a type of mounting hardgood.

Figure 11C:
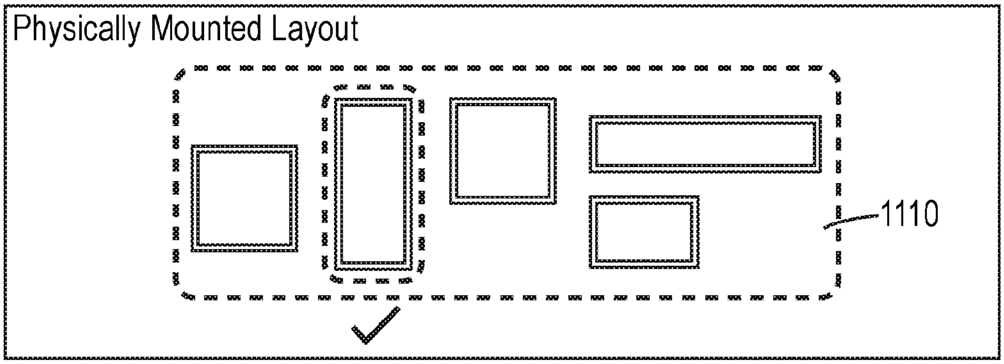
FIG. 11C depicts a corrected physically mounted layout of décor according to the correction suggestions of FIG. 11B in accordance with embodiments herein.

Referring now to FIG. 11C, a corrected/updated physically mounted layout of décor according to the correction suggestions of FIG. 11B is depicted. In this embodiment, the verified physical layout design 1110 provides visual confirmation of the conformity of all the décor to the virtual layout design 1100.

Figure 12:
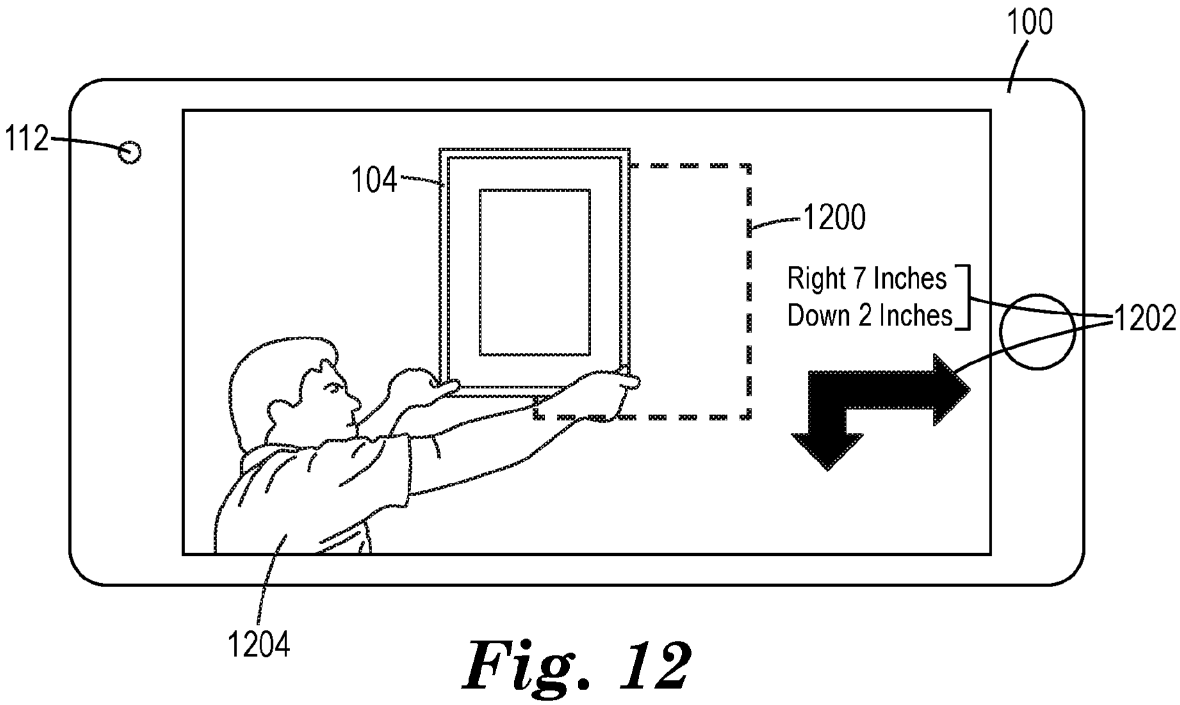
FIG. 12 depicts an augmented reality view of a user moving décor towards a suggested location overlain on a wall with feedback provided to guide the user in accordance with embodiments herein.

Referring now to FIG. 12, an AR view of an assistant 1204 moving décor 104 towards a suggested destination 1200 overlain on a wall 106 is depicted along with feedback provided to guide the user 102. In this embodiment, a variety of types of feedback may be given to assist in the placement of décor 104 to conform to a virtual layout design 1100, as described with respect to FIGS. 11A-11C. Feedback 1106 as depicted may be visual in the form an outline to represent the destination 1200 for the décor 104 in AR, with guiding indicators 1202, such as overlain arrows, indicating direction(s) and length of movement (which arrows may be unscaled or may be scaled in proportion to the length of recommended movement), and/or written directions about how far to move the décor 104 to conform to the suggested destination 1200. In this embodiment, the assistant 1204 may assist the user 102, who is operating the mobile device 100, such that the user 102 can verbally relay the movement directions to the assistant 1204 based on this onscreen feedback (e.g., the guiding indicators 1202). In some embodiments, audio feedback may be spoken to the user 102 who is hanging up the décor 104 alone and unable to view the mobile device 100. In other embodiments, audio feedback may be non-verbal, such as tones and/or beeps to indicate proximity of the décor 104 to the suggested destination 1200 (for instance, with the time between such tones or beeps being inversely proportional to the distance from the suggested destination 1200). In some embodiments, whether or not an assistant 1204 is present, feedback may be in the form of a visual indicator guiding placement of the contact area to intersect the corresponding support area, and/or haptic feedback from the mobile device 100 that may vary in speed, intensity, or both. Audio (verbal and/or non-verbal), visual, and/or haptic feedback may be utilized to guide placement of the décor and/or associated contact area(s) to align with the corresponding support area(s) 900 with the suggested destination 1200.

Figure 13:
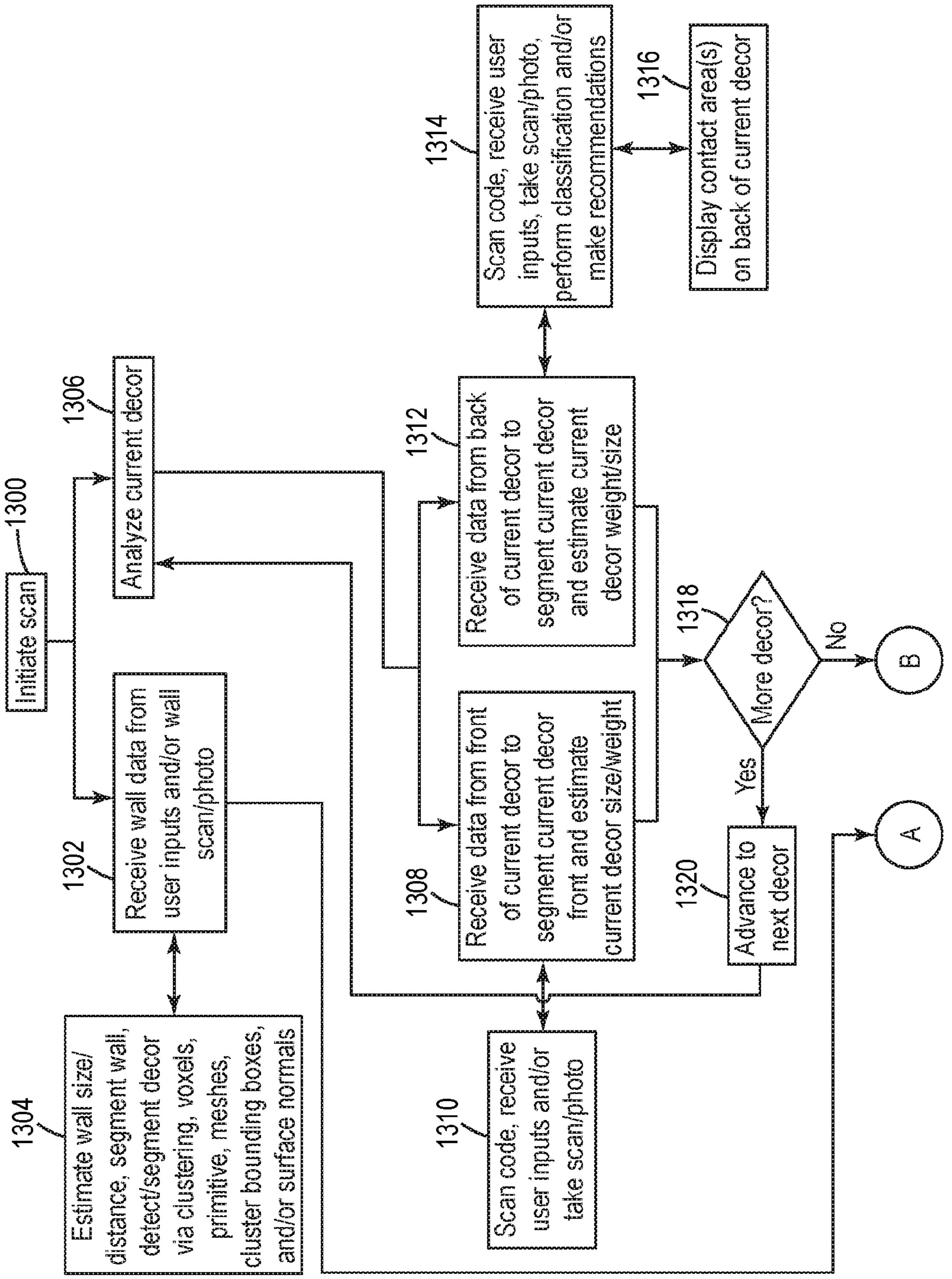
FIG. 13 is a flowchart for imaging and measuring walls and décor items in accordance with embodiments herein.
Figure 13:
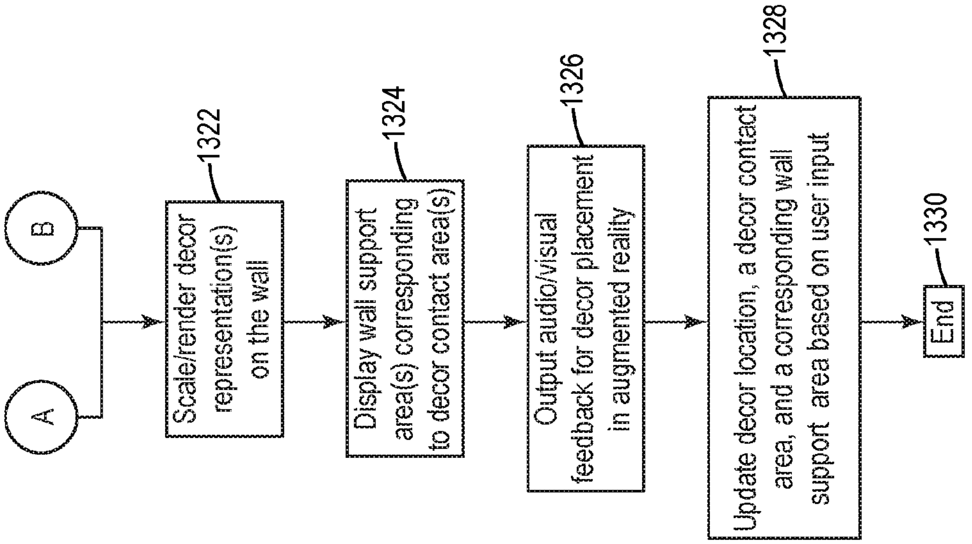

Referring now to FIG. 13, a flowchart for imaging and measuring walls and décor items is depicted. As explained below, in some embodiments computer vision and machine learning may be utilized to segment out walls and/or décor from other objects in the environment, to determine the dimensions of the décor and/or walls, scale and store images of the décor appropriately to the wall image scale, to identify and determine the position of the hanging mounts on the décor (i.e., contact areas), and to determine precise positioning of the décor and/or mounting hardware once it is placed on the wall or to predict where it should be placed on the wall (i.e., support areas) to create a desired design or layout.

At block 1300, a scan may be initiated utilizing three-dimensional and/or two-dimensional scanning of walls and/or décor. At block 1302, data pertaining to one or more walls and/or other surface(s) may be received from one or more three-dimensional scans (via a sensor using LiDAR or other suitable scanning technique), two-dimensional continual imaging (using a camera, for example), and/or one or more photos (using a camera, for example). In some embodiments, user inputs may be utilized to specify characteristics such as wall width, height, depth, and/or distance from the user.

At block 1304, further expanding upon the data obtained at block 1302, wall data may provide an estimate of the wall's height, width, and distance from the device obtaining the wall data. Segmentation of multiple walls and/or of portions of walls may be performed. As part of wall segmentation, wall distance determination, and/or wall size determination, any décor on and/or within view of a wall may be detected and/or segmented as part of a wall utilizing any suitable technique such as clustering, voxels, primitives, meshes, cluster bounding boxes, surface normals, and the like. For example, three-dimensional data obtained from a sensor may be processed to identify/group/cluster points or sections of the scan that are the target surfaces and/or objects (e.g., walls and/or décor). In another example, three-dimensional data in the form of voxels may be used in the form of x, y, and z coordinates such that each data point has three points in a three-dimensional space. In another example, primitives may be used as basic three-dimensional shapes (sphere, cube, pyramid, cone, etc.) that form the foundation atop which more detailed three-dimensional data can be layered to generate more detailed three-dimensional models of, for example, walls and/or décor. A mesh, or polygonal mesh, may be utilized in some embodiments to model a wall and/or décor, in which the mesh comprise vertices, edges, and faces based on the polyhedral object used for three-dimensional modeling. Another embodiment utilizes surface normals to help identify clustering of target objects (e.g., using surface normals to identify and separate the wall plane), wherein a normal is a line or vector that is perpendicular to an object or surface (such as the triangular mesh forming a three-dimensional model). For example, surface normals may be utilized in some embodiments to provide a visual representation of the orientation of a polygon's surface, essentially orthogonal to the plane or tangent of the portion of the polygon.

Continuing with block 1304, in which walls (and/or décor) may be segmented out from the background (and/or remaining portion(s) of three/two-dimensional image(s)), three-dimensional data may then be processed to identify/group/cluster points or sections of the scan that are the target objects (e.g., wall or décor). This may include identifying inliers vs outliers, clustering, and/or finding/segmenting out the biggest cluster among multiple clusters. Another embodiment utilizes plane segmentation, which can include input from a user, such as selecting two points to segment out the different plane(s) of/in the wall. In this way, the user input can identify the correct plane. Similarly, some embodiments provide for selecting the correct cluster for décor.

In embodiments, another approach may use clustering algorithms to segmentation of three-dimensional point cloud data. In this context, clustering may refer to dividing the three-dimensional points of a three-dimensional point cloud into groups. The decision to assign a point to a certain cluster can be based on a similarity function assessing the similarity of the given point to the other points in clusters. The similarity function can take different forms, in which it can be a function such as a Euclidean or Manhattan distance assigning a given point to the cluster whose mean (or other statistical moments) is physically-closest to the given point (geometrically), or a nonlinear function of (concrete or abstract) feature representations of the given point, e.g., a non-linear function (such as a neural network) of the Cartesian coordinates, as well as other properties of the given point such as color, surface roughness, or such properties of the neighboring points. Other unsupervised learning algorithms (e.g., k-means clustering) or statistical measures of similarity such as Pearson's correlation can also be used to form clusters of these three-dimensional points.

The performance of clustering algorithms may be evaluated in terms of the similarity of points within the cluster (intracluster similarity of inliers) compared to the similarity of points in any given cluster to points in other clusters (intercluster similarity of outliers). Acceptable clustering algorithms reduce intracluster similarity (homogeneity of points within the cluster) while simultaneously reducing intercluster similarity (generating clusters that are meaningfully different from each other, i.e., separation). These two objectives can be combined in Davies-Bouldin index or the silhouette coefficient.

Embodiments may utilize two-dimensional image segmentation to identify corresponding points or sections of the scans that are the target objects. More specifically, such an embodiment may utilize two-dimensional images to identify and segment the wall and any décor from the rest of the image and/or background thereof. Thus, once correspondence is obtained from the two-dimensional image and established with the three-dimensional data, this data can then be utilized to segment the three-dimensional data as well. Another embodiment utilizes pixel color in a texturized point cloud to aid segmentation, either with or without user input. As an example of this, user input includes having a user touch their device touchscreen to identify a pixel or group of pixels belonging to the wall, background, décor, and the like.

To segment three-dimensional data into discrete objects, embodiments may utilize clustering of the different three-dimensional points, voxels, primitives, meshes, etc. Segmentation approaches may be utilized to select the correct cluster for décor. For example, inlier/outlier clustering may be utilized on the points to group the points into various clusters. Next, to find cluster boundaries, an axis-aligned bounding box algorithm may be run on the cluster(s) and, in some embodiments, then run an iterative closest point algorithm to find better alignment. Another embodiment may include the bounding box algorithm making a first guess at a décor bounding box, which can be updated based upon received user input, with the option to then use such user correction as training data for future bounding box algorithm attempts/guesses. Machine learning algorithms, as discussed further herein, may be utilized to draw cluster bounding boxes based on cluster boundaries. In embodiments, an axis-aligned bounding box algorithm assumes that the boundaries of clusters form rectangular (or cubic in three dimensions) bounding boxes. Next, the algorithm calculates the gap between these bounding boxes (where each bounding box corresponds to a single cluster) by considering the cluster centroid (i.e., the middle of the cluster) and dimensions (corresponding to the box centroid and dimensions). Any negative gap between clusters means the clusters overlap. Such overlap may trigger an iterative closest point algorithm, where the points residing in the intersection of clusters are re-assigned to the cluster with the closest centroid, thereby increasing the separation between clusters. Various implementations of the axis-aligned bounding box algorithm can be generalized to spherical (or more generally, non-cubic) three-dimensional shapes. However, when focusing on walls and/or décor, rectangular bounding boxes cover a sufficiently expansive subset of the dataset.

In an embodiment utilizing LiDAR, once the wall and/or décor has been successfully segmented, the three-dimensional LiDAR data can then be used to find the dimensions of the wall or décor and rescale the corresponding images for AR visualization purposes. In another embodiment, dimensioning the wall and/or décor includes putting a known scale reference or fiducial (e.g., a Post-It® Note of a known size or a Command™ strip of a known size) on or near the object of interest. In this approach, discussed further herein with respect to FIGS. 2 and 4D, an image of the object of interest (wall, décor, and the like) with the fiducial may be captured. The fiducial may be detected and isolated so that its aspect ratio can be determined. The boundaries of the object of interest may be determined utilizing two-dimensional image segmentation approaches (which may include utilizing user input and/or training algorithms to extract décor and/or walls from background). The cropped image of the object of interest may then be output undistorted and then rescaled based on the aspect ratio of the known reference scale with respect to the fiducial.

In this embodiment, by using a pixels-per-area scale (such as pixels-per-inch, for example) the fiducial/known-scale reference approach can be more accurate for objects at the same depth or distance from the camera as the reference article. Thus, one embodiment utilizes information from LiDAR or a stereoscopic approach to do a rough perspective correction and to estimate depth distances from the plane of the reference scale and the object of interest (for example décor with a very thick frame).

In stereoscopic measurement embodiments, images may be obtained from multiple cameras to determine depth or generating a three-dimensional rendering of a space. The cameras observe the object of interest from different viewpoints (which is the case with cameras on smartphones—they are slightly displaced compared to each other). This different viewpoint results in an apparent shift (such as parallax) in the position of the object of interest when viewed from different angles. This apparent shift may be similar to looking at the same object with only the left or only the right eye (the viewer would notice a displacement when the object is against a marked background). Thus, an embodiment using a stereoscopic approach for dimensioning décor and/or walls utilizes, for example, two or more cameras available in a device such as a smartphone, tablet, and the like. Even if the two cameras have different lenses, if their respective fields of view overlap sufficiently, stereoscopic information can be obtained from the cameras to estimate depth and provide measurement information.

In embodiments, the size of the object of interest in images obtained from different cameras, along with prior knowledge of the relative position of the cameras and distance of the cameras from the wall, can be used to solve for the height of the object of interest (e.g., décor or a wall). The distance of the camera to the wall is thus considered. In cases where a LiDAR depth sensor is available, the camera-wall distance can be inferred from the three-dimensional point cloud from the LiDAR scan. In such cases, the result of the stereoscopic measurement can help improve the accuracy of décor segmentation. In embodiments having the absence of LiDAR, three-dimensional camera localization/tracking algorithms (e.g., using two-dimensional image data from cameras plus inertial measurement unit (IMU) data to localize the position of the camera in the room) or a fiducial marker on the wall can be used to specify the distance of camera to wall. In an embodiment, LiDAR may be used for measuring a wall and/or décor based upon a first distance and utilizing a known reference/fiducial or stereoscopic measurement based upon a second distance, wherein the first distance exceeds the second distance.

In embodiments, a user may be guided to the correct placement of the décor onto the wall. The user may use AR on their mobile device to help locate the correct hanging locations on a wall. From a distance, distinguishing two-dimensional image information in the room could be used to help anchor the mobile device to its relative location in space, so that markers (e.g., points of reference such as support areas on the wall, whether displayed as part of AR or drawn/marked on the wall) could appear in the correct location on the wall when viewed through the mobile device in AR. However, as the mobile device approaches the wall, assuming the wall is of uniform color and texture, visual anchoring points utilized by the mobile device may drop out of view, potentially making it difficult for the mobile device to maintain awareness of its location in relation to the wall and subsequently, potentially lack accurate guidance for marker placement. Thus, in such embodiments, as the mobile device approaches the wall and visual anchoring points go off-screen (i.e., no longer visible to the mobile device's camera) with a wall of uniform color and texture, the mobile device could transition to using data from an IMU, comprising gyroscope and accelerometer, in order to use dead reckoning techniques to provide relative mobile device location and maintain accurate marker placement. Specifically, dead reckoning can be used to calculate the mobile device's current position as it moves by using its previously determined position and to incorporate estimates of speed, heading direction, and course overtime. Thus, even in the presence of very limited or no distinguishing visual anchoring cues, embodiments can use both IMU data and visual features to work together, with the IMU 'taking over' when no visual anchor points are present, but with distinguishing visual features (once available) being used to recalibrate the IMU coordinates or after a certain amount of time has elapsed. Upon completion of block 1302, the flowchart proceeds to block 1322.

At block 1306, a current instance of décor is analyzed. It should be noted that blocks 1302 and 1306 are timing-independent, such that either may occur before the other, or both may occur simultaneously. At block 1308, data from the front of the current décor may be received and used to segment the décor with respect to its location on a wall (if applicable) and to estimate the height, width, depth, and/or weight of the current décor. In this embodiment, any of the functionality described in blocks 1302 and 1304 may be utilized in some embodiments in block 1308-1316. At block 1310, in furtherance of the processing at block 1308, data pertaining to the front of the current décor may be received via a scan of barcode/QR code, from user input, from two-dimensional data, such as from a live shot or one or more photos, and/or from three-dimensional data such as from LiDAR. At block 1312, data from the back of the current décor may be received and used to segment the décor with respect to its location on a wall (if applicable) and to estimate the height, width, depth, and/or weight of the current décor. Blocks 1308 and 1312 (along with associated blocks 1310, 1314, and 1316) are timing-independent, such that either may occur before the other, or both may occur simultaneously.

At block 1314, in furtherance of the processing at block 1312, data pertaining to the back of the current décor may be received via a scan of barcode/QR code, from user input, from two-dimensional data such as from a photo or live shot, and/or from three-dimensional data such as from LiDAR. This data may be used to perform classification (such as identifying mounting hardgood types located on the back of the décor frame) and/or make recommendations regarding suggested mounting hardgood types, quantities, and/or contact areas on the back of the décor frame.

One or more neural networks may be utilized for a variety of machine learning-related tasks described herein, such as object recognition/classification (décor, frame, mounting hardgoods, and the like) and/or providing recommendations (such as mounting hardgood types and/or quantities to use for décor, contact areas on the back frame of décor, wall support areas, and the like). By way of example, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error.

In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from natural language input to the processing engine and/or the data map, audio, images, clustering algorithms, bounding box algorithms, or combinations thereof.

In embodiments, a convolutional neural network (CNN) may be utilized. For example, a convolutional neural network (CNN) may be used as an ANN that, in a field of machine learning, for example, is a class of deep, feed-forward ANNs applied for adjuster assignment weights. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture. Embodiments may include artificial intelligence components selected from the group consisting of an artificial intelligence engine, Bayesian inference engine, and a decision-making engine, and may have an adaptive learning engine further comprising a deep neural network-learning engine. It is contemplated and within the scope of this disclosure that the term "deep" with respect to the deep neural network-learning engine is a term of art readily understood by one of ordinary skill in the art.

At block 1316, in furtherance of the processing at blocks 1312 and 1314, and as part of the processing of the back of décor, one or more contact areas may be determined and displayed on the back of the frame of the décor. For example, as depicted in the context of AR in FIG. 3A, visual indications of proposed contact points may be provided, and/or mounted hardgood(s) on the back of the frame of the décor, such as the detected sawtooth in FIG. 3C, may be detected.

At block 1318, a determination may be made as to whether there is more décor. If so, (condition "Yes" at 1318) then at block 1320 the next décor is selected and the flowchart returns to block 1306 to analyze the next décor. Otherwise (condition "No" at block 1318), the flowchart proceeds to block 1322. At block 1322, once (i) all of the décor has been analyzed from block 1318 and (ii) the wall has been analyzed from block 1302 (along with analysis at block 1304 in some embodiments), the décor may be rendered (and scaled in some embodiments) on the wall. This rendering/scaling may be in the context of, for example, an AR view of a live camera view of the wall or a photo of the wall. For a live AR view, as discussed herein, the rendering/scaling of the décor may be updated in near or substantially-near real-time. At block 1324, one or more support areas may be displayed upon the wall in an AR view of a live camera view of the wall or a photo of the wall, with or without the rendered décor. In some embodiments, one or more candidate support areas may be co-overlayed along with the rendered décor and/or corresponding décor contact areas. Continuing with these embodiments, once support areas have been confirmed, the confirmed support areas may then be displayed in AR with the rendered décor now removed. In other embodiments, some/all of the rendered wall décor may continue being displayed throughout the mounting process. In still other embodiments, only the décor actively being mounted has its rendering removed, such that the other décor in the AR view remains and another décor rending is removed once its turn to be mounted begins. In some embodiments, once décor is mounted, it may be re-rendered for comparison to the actual décor to show the user the accuracy of the mounting. In other embodiments, each newly-mounted décor may not be re-rendered once mounted, which may be based upon, for example, user input confirming the mounting and/or automatic detection of such mounting in the AR view. The wall support area(s) for a décor may be displayed as overlay(s) upon the wall with or without corresponding décor contact area(s) on the décor and/or a rendering of the décor.

At block 1326, visual, haptic, and/or audio feedback may be output to guide a user in their placement of décor upon the wall, as further described with respect to FIG. 12. At block 1328, a user may provide input to update the location of where they want the décor to be located, corresponding décor contact area(s), and/or the support area(s) on a wall corresponding to the corresponding décor contact area(s). Thus, the user may be able to update the location of where they want to mount the décor via updating the location of the décor itself (such as a representation of the décor and/or its frame if applicable), where the décor is mounted to the wall (décor contact areas), and/or points on the wall at which the décor is mounted (support areas). In some embodiments, movement by a user of one contact area with respect to the wall will update all other contact areas associated with an item of décor. Similarly, in some embodiments, movement by a user of one support area with respect to the wall will update all other contact areas associated with an item of décor.

Based upon the determinations in the preceding blocks, one embodiment may include an embodiment using LiDAR and/or camera to take images and scans of the front and back of décor and a wall of interest. Segmenting out of three-dimensional and/or two-dimensional data may then be utilized to find the dimensions of the wall of interest and/or the décor. The décor may be scaled so that it is on the same scale as the wall to allow for effective AR visualization. As an alternative to LiDAR, the user may add a fiducial marker (e.g., Post-It® Note, Command™ Strip, prior décor with known dimensions to base subsequent positions, and the like). Dimensions and metrically precise positioning may then be estimated via stereoscopic vision method or via known object/fiducial approaches described herein. Subsequent placement instructions may be provided to the user visually via AR, auditorily via tones and/or verbal instructions, and/or haptic/vibratory feedback. At block 1330, the flowchart terminates.

Figure 14:
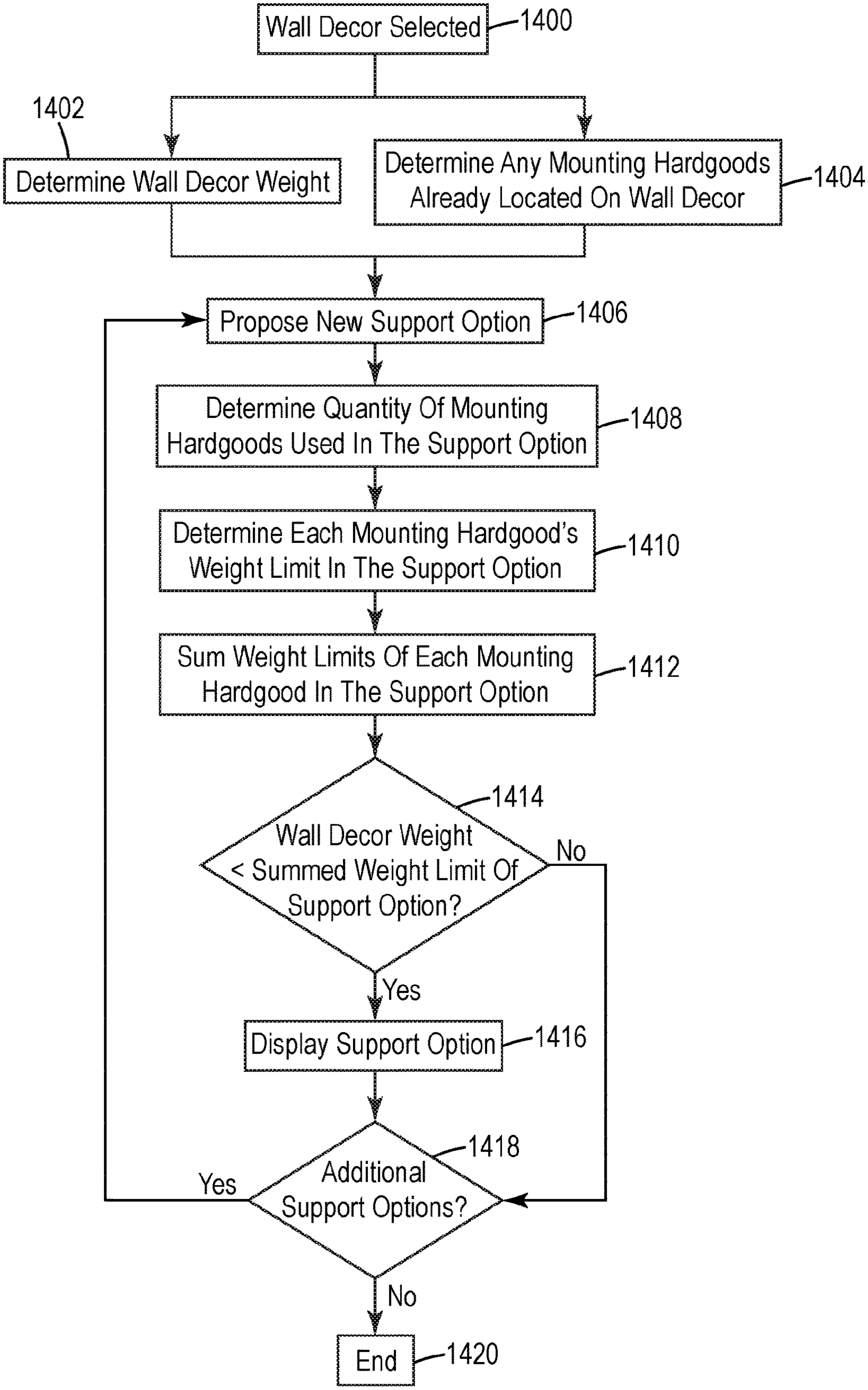
FIG. 14 is a flowchart for weight-based support options assessment in accordance with embodiments herein.

Referring now to FIG. 14, a flowchart for weight-based support options assessment according to one embodiment is depicted. At block 1400, an item of décor may be selected. At block 1402, the weight of the décor may be determined according to the embodiments herein. For example, the décor weight may be retrieved from a database based upon a scan of a barcode or QR code associated with the décor, or a user selecting décor in a graphical user interface (such as on a website or app). In other examples, object recognition utilizing neural networks may be utilized to identify the décor type, material, and/or dimensions in order to estimate or precisely determine the weight of the décor. At block 1404, any mounting hardgoods already located on the décor may be assessed/identified in ways similar to how the weight of the décor is assessed at block 1402. It should be noted that blocks 1402 and 1404 are timing-independent, such that either may occur before the other, or both may occur simultaneously. At block 1406, once the weight of the décor has been determined and any pre-existing mounting hardgoods have been determined, proposed support options for mounting hardgoods may be proposed. At block 1408, the quantity of mounting hardgoods may be determined, which may be based upon factors such as the number of contact areas available on the décor or other suitable portion of the décor and/or characteristics of the type of mounting hardgood.

At block 1410, the individual weight limit of each mounting hardgood within the support option may be determined. This may be determined, for example, by retrieving maximum weight support data for a particular type of mounting hardgood from a database and/or any other suitable source. At block 1412, the maximum weight support amount for each mounting hardgood within the support option may be added up together to determine the total weight limit of all the mounting hardgoods within the support option. At block 1414, a determination may be made as to whether the décor's weight is less than the summed weight of all the mounting hardgoods within the support option. If not, (condition "No" at 1414), the flowchart proceeds to block 1418. Otherwise, if so (condition "Yes" at 1414), then at block 1416 the support option may be displayed. In some embodiments, each support option may be displayed as soon as this determination is made. In other embodiments, only once all the support options satisfying block 1414 have been determined, then all the qualifying support options are displayed or are at least accessible together. At block 1418, a determination may be made as to whether additional support options are available. If so (condition "Yes" at 1418), then the flowchart returns to block 1406 to propose another support option. Otherwise (condition "No" at 1418), if there are no further support options, the flowchart terminates at block 1420.

Figure 15:
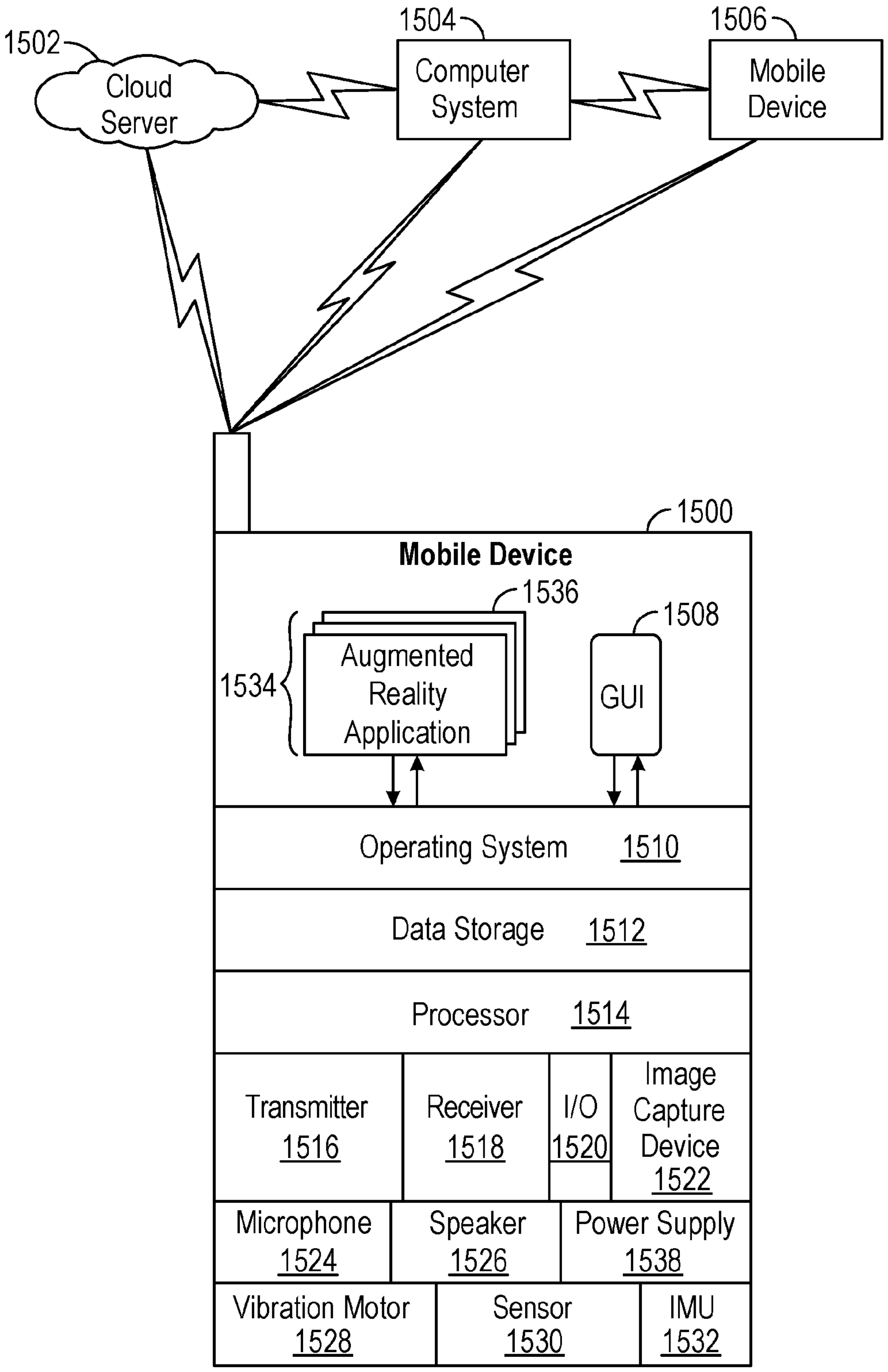
FIG. 15 is a block diagram of mobile device computing hardware utilized to implement various embodiments herein.

Referring now to FIG. 15, a block diagram depicts an example of mobile device computing hardware configured to operate in accordance with the techniques described herein. In this embodiment, the mobile device 1500 includes various hardware components that provide functionality for its operation (smartphone, tablet, laptop, and the like), although stationary computing devices may be utilized in some embodiments. For example, the mobile device 1500 includes one or more programmable processors 1514 configured to operate according to executable instructions (i.e., program code), typically stored in a computer-readable medium or data storage 1512 such as static, random-access memory (SRAM) device or Flash memory device. I/O (input/output) devices 1520 may include one or more output devices (e.g., one or more displays (i.e., display hardware), keyboard, camera button, power button, volume button, home button, back button, menu button, and the like) and/or input devices (mouse, keyboard, disk/media drive, memory stick/thumb-drive, memory card, pen, touch-input device, biometric scanner, voice/auditory input device, motion-detector, camera, scale).

Data storage 1512 may be a non-transitory computer readable medium, which includes tangible media that is able to store instructions associated with, or used by, a device or system. A non-transitory computer readable medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A non-transitory computer readable medium may also include, for example, a system or device that is of a magnetic, optical, semiconductor, or electronic type. A non-transitory computer readable medium excludes carrier waves and/or propagated signals taking any number of forms such as optical, electromagnetic, or a combination thereof.

Transmitter(s) 1516 and receiver(s) 1518 provide wireless communication with other devices, such as a cloud server 1502, a computer system 1504, or another mobile device 1506 via a wireless communication interface utilizing a transmitter 1516 and receiver 1518, such as (but not limited to) high-frequency radio frequency (RF) signals, LTE, WiMAX, UMTS, CDMA, GSM, Wi-Fi, IrDA, Bluetooth, Wireless USB, Z-Wave, ZigBee, and/or other near field communication protocols. A microphone 1524 converts audio information into corresponding electrical signals. A speaker 1526 converts electrical signals into corresponding audio information. A vibration motor 1528 is used to cause mobile device 1500, or housing for it, to vibrate. Mobile device 1500 may include additional discrete digital logic or analog circuitry. A power supply 1536, such as any suitable type of battery (e.g., lithium ion) or wired power supply is utilized to supply power to the mobile device 1500.

In general, an operating system 1510 executes on one or more processors 1514 and provides an operating environment for one or more user applications 1534 (i.e., "apps"), AR software described herein. User applications 1534 may, for example, comprise executable program code stored in computer-readable storage device (e.g., data storage 1512) for execution by the processor(s) 1514. As other examples, user applications 1534 may comprise firmware or, in some examples, may be implemented in discrete logic. An IMU 1532 or similar hardware may be utilized to determine an object's specific force, angular rate, and orientation, and may comprise any combination of accelerometers and gyroscopes.

In operation, mobile device 1500 receives input sensor and/or image data and processes the input sensor and/or image data in accordance with the techniques described herein. For example, an image capture device 1522 (e.g., a camera and the like) may capture an input image of an environment and/or a sensor 1530 (e.g., a depth sensor such as a LiDAR sensor and the like) may capture sensor data of an environment. As used herein, surface detection hardware and/or object detection hardware may refer, for example, to an image capture device 1522 and/or a sensor 1530. As another example, the mobile device 1500 may receive image and/or sensor 1530 data from external sources, such as cloud server 1502, computer system 1504, or another mobile device 1506, via receiver 1518. In general, the mobile device 1500 stores data in data storage 1512 for access and processing by user applications 1534 may include AR applications and/or other applications. Applications 1534 may invoke kernel functions of operating system 1510 to output a graphical user interface (GUI) 1508 for presenting information to a user of mobile device 1500.

It should now be understood that embodiments described herein are directed to utilizing AR to more efficiently plan, arrange, and placing décor upon walls in a way not possible without the embodiments described herein. In this way, users can capture image and/or three-dimensional data pertaining to walls and décor. By generating virtual representations of the décor to be placed on a wall in AR, users can choose from a variety of potential arrangements and greatly increase their accuracy in placing their arrangements. Recommendations for different types of support devices are provided based upon the determined weight and structure of the décor. Live feedback can also be provided to assist users in placing their décor upon the correct spot on the wall.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
- detecting, via object detection hardware, a portion of at least one of a plurality of objects;
- receiving object attributes for the at least one of a plurality of objects;
- providing at least one contact area, based upon the object attributes, on each of a plurality of object representations corresponding to each of the at least one of a plurality of objects;
- providing a surface representation;
- displaying, via display hardware, the plurality of object representations each residing upon the surface representation; and
- displaying at least one support area on the surface representation corresponding to the at least one contact area associated with the plurality of object representations.

2. The method of claim 1, wherein receiving object attributes for each of the at least one of a plurality of objects further comprises receiving object attributes for each of the at least one of a plurality of objects based upon the detecting.

3. The method of claim 1, wherein receiving object attributes for each of the at least one of a plurality of objects further comprises receiving user input specifying one or more size object measurements.

4. The method of claim 1, wherein receiving object attributes for each of the at least one of a plurality of objects further comprises receiving user input selecting one object size option from among a plurality of object size options.

5. The method of claim 1, further comprising updating, based upon received input to move a selected object representation, locations of:
- the selected object representation upon the surface representation;
- each contact area of the selected object representation; and
- each support area corresponding to each contact area of the selected object representation.

6. The method of claim 1, further comprising detecting, via surface detection hardware, (i) a surface within a line of sight of the surface detection hardware and (ii) attributes of the surface.

7. The method of claim 1, wherein providing a representation of a surface further comprises detecting, via surface detection hardware, a surface within a line of sight of the surface detection hardware.

8. A computing device comprising:
- a memory and a processor, wherein the memory is coupled to the processor;
- object detection hardware communicatively coupled to the processor, the object detection hardware in combination with the processor being configured to:
  - detect a portion of each of a plurality of objects;
  - determine object attributes for each of the plurality of objects based upon the detected portion of each of the plurality of objects;
  - provide at least one contact area, based upon the object attributes, on each of a plurality of object representations corresponding to each of the plurality of objects;
- surface detection hardware communicatively coupled to the processor, the surface detection hardware in combination with the processor being configured to:
  - detect a surface within a line of sight of the surface detection hardware; and
  - detect attributes of the surface;
- display hardware communicatively coupled to the processor, the display hardware in combination with the processor being configured to:
  - display the plurality of object representations each residing upon a same surface representation; and
  - display a plurality of support areas on the surface representation corresponding to contact areas associated with the plurality of object representations.

9. The computing device of claim 8, wherein receiving object attributes for each of the at least one of a plurality of objects further comprises receiving object attributes for each of the at least one of a plurality of objects based upon the detecting.

10. The computing device of claim 8, wherein receiving object attributes for each of the at least one of a plurality of objects further comprises receiving user input specifying one or more size object measurements.

11. The computing device of claim 8, wherein receiving object attributes for each of the at least one of a plurality of objects further comprises receiving user input selecting one object size option from among a plurality of object size options.

12. The computing device of claim 8, wherein the processor is further configured to update, based upon received input to move a selected object representation, locations of:

the selected object representation upon the surface representation;

each contact area of the selected object representation; and each support area corresponding to each contact area of the selected object representation.

13. The computing device of claim 8, wherein the object detection hardware is further configured to detect, via surface detection hardware, (i) a surface within a line of sight of the surface detection hardware and (ii) attributes of the surface.

14. The computing device of claim 8, wherein providing a representation of a surface further comprises detecting, via the surface detection hardware, a surface within a line of sight of the surface detection hardware.

15. A non-transitory computer-readable storage medium encoded with instructions that, when executed, configure processing circuitry of a computing device for:

detecting, via object detection hardware, a portion of at least one of a plurality of objects;

receiving object attributes for the at least one of a plurality of objects;

providing at least one contact area, based upon the object attributes, on each of a plurality of object representations corresponding to each of the at least one of a plurality of objects;

providing a surface representation;

displaying, via display hardware, the plurality of object representations each residing upon the surface representation; and displaying at least one support area on the surface representation corresponding to the at least one contact area associated with the plurality of object representations.

16. The non-transitory computer-readable storage medium of claim 15, wherein receiving object attributes for each of the at least one of a plurality of objects further comprises receiving object attributes for each of the at least one of a plurality of objects based upon the detecting.

17. The non-transitory computer-readable storage medium of claim 15, wherein receiving object attributes for each of the at least one of a plurality of objects further comprises receiving user input specifying one or more size object measurements.

18. The non-transitory computer-readable storage medium of claim 15, wherein receiving object attributes for each of the at least one of a plurality of objects further comprises receiving user input selecting one object size option from among a plurality of object size options.

19. The non-transitory computer-readable storage medium of claim 15, further comprising instructions for updating, based upon received input to move a selected object representation, locations of:

the selected object representation upon the surface representation;

each contact area of the selected object representation; and each support area corresponding to each contact area of the selected object representation.

20. The non-transitory computer-readable storage medium of claim 15, further comprising instructions for detecting, via surface detection hardware, (i) a surface within a line of sight of the surface detection hardware and (ii) attributes of the surface.

* * * * *